United States Patent
Daley et al.

(10) Patent No.: US 9,967,848 B2
(45) Date of Patent: *May 8, 2018

(54) SYSTEMS AND METHODS FOR SYNCHRONIZING MULTIPLE ELECTRONIC DEVICES

(71) Applicant: GOOGLE TECHNOLOGY HOLDINGS LLC, Mountain View, CA (US)

(72) Inventors: Michael J. Daley, Santa Clara, CA (US); Travis Bolinger, Lafayette, CO (US); Heath O'Neal, Broomfield, CO (US)

(73) Assignee: GOOGLE TECHNOLOGY HOLDINGS LLC, Mountain View, CA (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/794,868

(22) Filed: Oct. 26, 2017

(65) Prior Publication Data

US 2018/0049146 A1 Feb. 15, 2018

Related U.S. Application Data

(63) Continuation of application No. 15/681,193, filed on Aug. 18, 2017, which is a continuation of application (Continued)

(51) Int. Cl.
*G11B 15/14* (2006.01)
*H04H 20/08* (2008.01)
(Continued)

(52) U.S. Cl.
CPC ........ *H04W 56/0015* (2013.01); *H04H 20/08* (2013.01); *H04H 20/18* (2013.01);
(Continued)

(58) Field of Classification Search
CPC .... H04J 3/0664; H04J 3/0682; H04H 10/103; H04H 20/18; H04H 20/20; H04H 20/26;
(Continued)

(56) References Cited

U.S. PATENT DOCUMENTS

| | | |
|---|---|---|
| 4,816,989 A | 3/1989 | Finn et al. |
| 5,404,811 A | 4/1995 | Schiel et al. |

(Continued)

FOREIGN PATENT DOCUMENTS

| | | |
|---|---|---|
| EP | 0251584 A2 | 1/1988 |
| EP | 0672985 A1 | 9/1995 |

(Continued)

OTHER PUBLICATIONS

"AudioTron Quick Start Guide, Version 1.0", Voyetra Turtle Beach, Inc., Mar. 2001, 24 pages.

(Continued)

*Primary Examiner* — Nabil Hindi
(74) *Attorney, Agent, or Firm* — Marshall, Gerstein & Borun LLP

(57) ABSTRACT

Embodiments are provided for syncing multiple electronic devices for collective audio playback. According to certain aspects, a master device connects (218) to a slave device via a wireless connection. The master device calculates (224) a network latency via a series of network latency pings with the slave device and sends (225) the network latency to the slave device. Further, the master devices sends (232) a portion of an audio file as well as a timing instruction including a system time to the slave device. The master device initiates (234) playback of the portion of the audio file and the slave devices initiates (236) playback of the portion of the audio file according to the timing instruction and a calculated system clock offset value.

20 Claims, 16 Drawing Sheets

Related U.S. Application Data

No. 15/052,503, filed on Feb. 24, 2016, now Pat. No. 9,769,778, which is a continuation of application No. 13/945,493, filed on Jul. 18, 2013, now Pat. No. 9,307,508.

(60) Provisional application No. 61/816,972, filed on Apr. 29, 2013.

(51) Int. Cl.

| | |
|---|---|
| *H04H 20/18* | (2008.01) |
| *H04W 56/00* | (2009.01) |
| *H04H 20/38* | (2008.01) |
| *H04H 20/61* | (2008.01) |
| *H04H 60/88* | (2008.01) |
| *H04H 20/57* | (2008.01) |
| *H04H 20/63* | (2008.01) |
| *H04H 60/80* | (2008.01) |

(52) U.S. Cl.
CPC ............ *H04H 20/38* (2013.01); *H04H 20/61* (2013.01); *H04H 60/88* (2013.01); *H04W 56/0065* (2013.01); *H04H 20/57* (2013.01); *H04H 20/63* (2013.01); *H04H 60/80* (2013.01)

(58) Field of Classification Search
CPC ........ H04H 20/38; H04H 20/57; H04H 20/63; H04H 60/80; H04H 60/27; H04W 88/04; G06F 3/048; G06F 3/0482; G06F 3/0484; G06F 3/16; G06F 3/165; G06F 3/167; G06F 17/00; G11B 27/10; G11B 15/14; G11B 15/083; G11B 27/105; H04L 12/1836; H04L 20/06027; H04L 65/4076; H04L 65/4092; H04L 65/60; H04L 65/604; H04L 65/4084; H04L 65/80; H04N 21/4035; H04N 21/4302; H04N 21/4307; H04N 21/43615; H04N 21/04; H04N 21/41407
USPC .......... 360/64; 370/260, 350, 392, 432, 503, 370/516, 528; 375/262; 381/2, 79, 80, 381/82; 386/211, 219; 700/94; 704/260; 709/204, 208, 219, 231; 713/500; 718/100
See application file for complete search history.

(56) References Cited

U.S. PATENT DOCUMENTS

| | | | |
|---|---|---|---|
| 5,491,839 A | 2/1996 | Schotz | |
| 5,668,884 A | 9/1997 | Clair, Jr. et al. | |
| 5,673,323 A | 9/1997 | Schotz et al. | |
| 5,775,996 A | 7/1998 | Othmer et al. | |
| 5,815,689 A | 9/1998 | Shaw et al. | |
| 5,867,691 A | 2/1999 | Shiraishi | |
| 5,875,354 A | 2/1999 | Charlton et al. | |
| 5,887,143 A | 3/1999 | Saito et al. | |
| 5,923,902 A | 7/1999 | Inagaki | |
| 5,946,343 A | 8/1999 | Schotz et al. | |
| 6,009,457 A | 12/1999 | Moller | |
| 6,031,818 A | 2/2000 | Lo et al. | |
| 6,128,318 A | 10/2000 | Sato | |
| 6,175,872 B1 | 1/2001 | Neumann et al. | |
| 6,185,737 B1 | 2/2001 | Northcutt et al. | |
| 6,199,169 B1 | 3/2001 | Voth | |
| 6,256,554 B1 | 7/2001 | DiLorenzo | |
| 6,324,586 B1 | 11/2001 | Johnson | |
| 6,332,147 B1 | 12/2001 | Moran et al. | |
| 6,351,821 B1 | 2/2002 | Voth | |
| 6,487,296 B1 | 11/2002 | Allen et al. | |
| 6,522,886 B1 | 2/2003 | Youngs et al. | |
| 6,526,325 B1 | 2/2003 | Sussman et al. | |
| 6,598,172 B1 | 7/2003 | VanDeusen et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 6,836,788 B2 | 12/2004 | Kim et al. |
| 6,898,642 B2 | 5/2005 | Chafle et al. |
| 6,912,610 B2 | 6/2005 | Spencer |
| 6,920,373 B2 | 7/2005 | Xi et al. |
| 6,934,766 B1 | 8/2005 | Russell |
| 7,007,106 B1 | 2/2006 | Flood et al. |
| 7,047,308 B2 | 5/2006 | Deshpande |
| 7,115,017 B1 | 10/2006 | Laursen et al. |
| 7,130,608 B2 | 10/2006 | Hollstrom et al. |
| 7,130,616 B2 | 10/2006 | Janik |
| 7,143,939 B2 | 12/2006 | Henzerling |
| 7,185,090 B2 | 2/2007 | Kowalski et al. |
| 7,206,367 B1 | 4/2007 | Moore |
| 7,209,795 B2 | 4/2007 | Sullivan et al. |
| 7,236,773 B2 | 6/2007 | Thomas |
| 7,372,846 B2 | 5/2008 | Zwack |
| 7,392,102 B2 | 6/2008 | Sullivan et al. |
| 7,571,014 B1 | 8/2009 | Lambourne et al. |
| 7,643,894 B2 | 1/2010 | Braithwaite et al. |
| 7,657,910 B2 | 2/2010 | McAulay et al. |
| 7,742,740 B2 | 6/2010 | Goldberg et al. |
| 7,882,324 B2 | 2/2011 | Schnell et al. |
| 7,894,511 B2 | 2/2011 | Zurek et al. |
| 8,014,423 B2 | 9/2011 | Thaler et al. |
| 8,045,952 B2 | 10/2011 | Qureshey et al. |
| 8,233,648 B2 | 7/2012 | Sorek et al. |
| 8,234,395 B2 | 7/2012 | Millington |
| 2001/0032188 A1 | 10/2001 | Miyabe et al. |
| 2001/0042107 A1 | 11/2001 | Palm |
| 2002/0002562 A1 | 1/2002 | Moran et al. |
| 2002/0022453 A1 | 2/2002 | Balog et al. |
| 2002/0026442 A1 | 2/2002 | Lipscomb et al. |
| 2002/0034374 A1 | 3/2002 | Barton |
| 2002/0073228 A1 | 6/2002 | Cognet et al. |
| 2002/0090914 A1 | 7/2002 | Kang et al. |
| 2002/0112244 A1 | 8/2002 | Liou et al. |
| 2002/0118199 A1 | 8/2002 | Mukherjee et al. |
| 2002/0124097 A1 | 9/2002 | Isely et al. |
| 2002/0143998 A1 | 10/2002 | Rajagopal et al. |
| 2002/0163361 A1 | 11/2002 | Parkin |
| 2002/0165921 A1 | 11/2002 | Sapieyevski |
| 2003/0035444 A1 | 2/2003 | Zwack |
| 2003/0041173 A1 | 2/2003 | Hoyle |
| 2003/0066094 A1 | 4/2003 | van der Schaar et al. |
| 2003/0099212 A1 | 5/2003 | Anjum et al. |
| 2003/0126211 A1 | 7/2003 | Anttila et al. |
| 2003/0157951 A1 | 8/2003 | Hasty |
| 2003/0195964 A1 | 10/2003 | Mane |
| 2003/0198257 A1 | 10/2003 | Sullivan et al. |
| 2003/0210796 A1 | 11/2003 | McCarty et al. |
| 2003/0231871 A1 | 12/2003 | Ushimaru |
| 2004/0001591 A1 | 1/2004 | Mani et al. |
| 2004/0024478 A1 | 2/2004 | Hans et al. |
| 2004/0024925 A1 | 2/2004 | Cypher et al. |
| 2004/0027166 A1 | 2/2004 | Mangum et al. |
| 2004/0203378 A1 | 10/2004 | Powers |
| 2004/0230664 A1 | 11/2004 | Bowers et al. |
| 2004/0249982 A1 | 12/2004 | Arnold et al. |
| 2004/0252400 A1 | 12/2004 | Blank et al. |
| 2005/0010691 A1 | 1/2005 | Oyadomari et al. |
| 2005/0058149 A1 | 3/2005 | Howe |
| 2005/0081213 A1 | 4/2005 | Suzuoki et al. |
| 2005/0207387 A1 | 9/2005 | Middleton et al. |
| 2005/0286546 A1 | 12/2005 | Bassoli et al. |
| 2007/0038999 A1 | 2/2007 | Millington |
| 2007/0142944 A1 | 6/2007 | Goldberg et al. |
| 2007/0226530 A1 | 9/2007 | Celinski et al. |
| 2007/0250761 A1 | 10/2007 | Bradley et al. |
| 2008/0031283 A1 | 2/2008 | Curran-Gray et al. |
| 2008/0177822 A1 | 7/2008 | Yoneda |
| 2009/0157905 A1 | 6/2009 | Davis |
| 2010/0042239 A1 | 2/2010 | Moore et al. |
| 2010/0220748 A1 | 9/2010 | Inomata |
| 2012/0082424 A1 | 4/2012 | Hubner et al. |

(56) References Cited

U.S. PATENT DOCUMENTS

| | | |
|---|---|---|
| 2013/0097506 A1 | 4/2013 | Millington |
| 2013/0188632 A1 | 7/2013 | Sheth et al. |
| 2013/0254419 A1 | 9/2013 | Millington |
| 2013/0331970 A1 | 12/2013 | Beckhardt et al. |
| 2013/0336498 A1 | 12/2013 | Haatainen |
| 2014/0177864 A1 | 6/2014 | Kidron |
| 2014/0185842 A1 | 7/2014 | Kang et al. |
| 2014/0226949 A1 | 8/2014 | Onishi |
| 2014/0323036 A1 | 10/2014 | Daley et al. |

FOREIGN PATENT DOCUMENTS

| | | |
|---|---|---|
| EP | 1111527 A2 | 6/2001 |
| WO | WO-9525313 A1 | 9/1995 |
| WO | WO-9961985 A1 | 12/1999 |
| WO | WO-0153994 A2 | 7/2001 |

OTHER PUBLICATIONS

"AudioTron Reference Manual, Version 3.0". Voyetra Turtle Beach, Inc. May 2002, 70 pages.
"AudioTron Setup Guide, Version 3.0", Voyetra Turtle Beach, Inc., May 2002, 38 pages.
"Bluetooth. "Specification of the Bluetooth System: The ad hoc SCATTERNET for affordable and highly functional wireless connectivity" Core, Version 1.0 A, Jul. 26, 1999, 1068 pages".
Bluetooth. "Specification of the Bluetooth System: Wireless connections made easy" Core, Version 1.0 B, Dec. 1, 1999, 1076 pages.
"Dell, Inc. "Dell Digital Audio Receiver: Reference Guide" Jun. 2000, 70 pages".
"Dell, Inc. "Start Here" Jun. 2000, 2 pages".
Jones, Stephen. "Dell Digital Audio Receiver,: Digital upgrade for your analog stereo" Analog Stereo. Jun. 24, 2000 <http://www.reviewonline.com/articles/961906868.htm> retrieved Jun. 18, 2014, 2 pages.
"Louderback, Jim. "Affordable Audio Receiver Furnishes Homes with MP3" TechTV Vault. Jun. 28, 2000 <http://www.g4tv.com/articles/afforable-audio-receiver-furnishes-homes-with-mp3/> retrieved Jul. 10, 2014, 2 pages".
"Palm, Inc. "Handbook for the Palm VII Handheld" May 2000, 311 pages".
"Presentations at WinHEC 2000" May 2000, 138 pages.
Akyildiz I.F., et al. "Multimedia Group Synchronization Protocois for Integrated Services Networks," IEEE Journal on Selected Areas in Communication, 1996, vol. 14 (1), pp. 162-173.
Benslimane, A., "A Multimedia Synchronization Protocol for Multicast Groups," Proceedings of the 26th Euromicro Conference, 2000, vol. 1, pp. 456-463.
Biersack E., et al. "Intra-and Inter-Stream Synchronisation for Stored Multimedia Streams," IEEE International Conference on Multimedia Computing and Sytems, 1996, pp. 372-381.
Bretl W.E., et al., MPEG2 Tutorial [online], 2000 [retrieved on Jan. 13, 2009] Retrieved from the Internet< http://www.bretl.com/mpeghtml/MPEGindex.htm>, pp. 1-23.
Huang C.M., et al., "A Synchronization Infrastructure for Multimedia at the Presentation Layer," IEEE Transactions on Consumer Electronics, 1997, vol. 43 (3), pp. 370-380.
International Search Report for Application No. PCT/US04/23102, dated Aug. 1, 2008, 5 pages.
Ishibashi Y., "A Group Synchronization Mechanism for Stored Media in Multicast Communications," IEEE Information Revolution and Communications, 1997, vol. 2, pp. 692-700.
Ishibashi Y., "A Group Synchronization Mechanism for Live Media in Multicast Communications," IEEE Information Revolution and Communications, 1997, vol. 2, pp. 746-752.
Jo J., et al. "Synchronized One-to many Media Streaming with Adaptive Playout Control," Proceedings of SPIE, 2002, vol. 4861, pp. 71-82.
Mills D.L., "Network Time Protocol (Version 3) Specification, Implementation and Analysis," Network Working Group, Mar. 1992, <http://www.ietf.org/rfc/rfc1305.txt>.
Mills D.L., "Precision Synchronization of Computer Network Clocks," ACM SIGCOMM Computer Communication Review, 1994, vol. 24 (2), pp. 28-43.
Park S., et al. "Group Synchronization in MultiCast Media Communications," Proceedings of the 5th Research on Multicast Technology Workshop, 2003.
Rothermel K., et al., "An Adaptive Stream Synchronization Protocol," 5th International Workshop on Network and Operationg Systems Supporting for Digital and Video, 1995.
Schulzrinne H., et al. "RTP: A Transport Protocol for Real-Time Applications, RFC 3550" Network Working Group, 2003, pp. 1-89.
UPnP, "Universal Plug and Play Device Architecture, Jun. 8, 2000: version 1.0; Microsoft Corporation; pp. 1-54".
International Search Report and Written Opinion for Application No. PCT/US2014/035388, dated Nov. 18, 2014.
Supertrumpf OG & ASK! GesmbH, "Seedio", https://itunes.apple.com/us/app/seedio/id546283234?mt=8, accessed from Internet Apr. 29, 2013, 4 pages.

SYSTEMS AND METHODS FOR SYNCHRONIZING MULTIPLE ELECTRONIC DEVICES

CROSS-REFERENCE TO RELATED APPLICATIONS

This application is a continuation of U.S. patent application Ser. No. 15/681,193, filed Aug. 18, 2017, which is a continuation of U.S. patent application Ser. No. 15/052,503, filed Feb. 24, 2016, now U.S. Pat. No. 9,769,778, which is a continuation of U.S. patent application Ser. No. 13/945,493, now U.S. Pat. No. 9,307,508, filed Jul. 18, 2013, which claims priority benefit of U.S. Provisional Application No. 61/816,972, filed Apr. 29, 2013.

All of the above-identified patent applications are incorporated herein by reference.

FIELD

This application generally relates to synchronizing multiple electronic devices. In particular, the application relates to platforms and techniques for determining latency time values associated with multiple electronic devices to synchronize playback of audio from the multiple electronic devices.

BACKGROUND

Various known electronic devices support audio playback through audio components such as external speakers. For example, a user may use speakers for audio playback in situations in which the user does not have or does not wish to use headphones or earbuds. In some cases, respective users of multiple electronic devices may wish to collectively listen to a song via the respective speakers of their multiple electronic devices. The resulting combined audio from the multiple speakers may be louder than audio output from a single speaker and therefore may provide a better listening experience for the users.

Existing techniques for syncing and playing audio from multiple speakers result in inaccurate setup and, accordingly, out-of-sync audio playback. In particular, the existing techniques do not account for various timing offsets, latency buffering, and re-connecting attempts. Additionally, the existing techniques do not adequately handle packets of audio data to facilitate the audio playback from the multiple devices. Accordingly, there is an opportunity to implement embodiments for syncing multiple electronic devices such that audio playback from the multiple electronic devices is synchronized. Additionally, there is an opportunity to implement embodiments for exchanging data parameters among multiple electronic devices to initiate audio playback and accurately synchronize the audio playback based on the data parameters.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DETAILED DESCRIPTION

Figure 1:
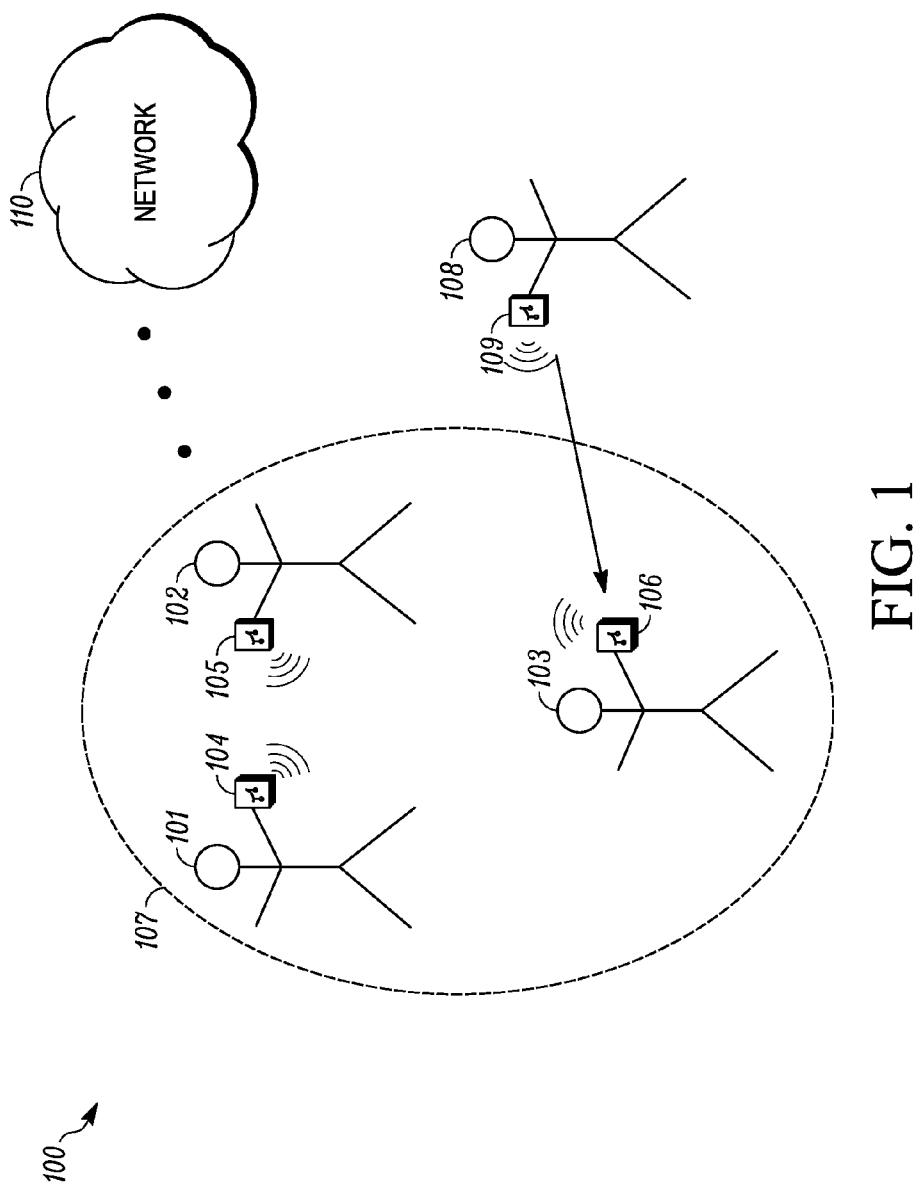
FIG. 1 depicts an example representation of electronic devices capable of group audio playback in accordance with some embodiments.

Embodiments as detailed herein enable multiple electronic devices to play or output audio via their speakers with reduced or eliminated synchronization issues. In this way, one or more users of the electronic devices can listen to the audio without experiencing delays or offsets in the audio output timing of the respective electronic devices. At a given time, one of the electronic devices is deemed a master device and the remaining one or more electronic devices are deemed slave devices.

According to some embodiments, the master device can detect one or more slave devices via near field communication (NFC) and connect to the slave devices via a wireless connection, such as Wi-Fi Direct or another wireless connection. The master device can query the slave devices and calculate a network latency time value for each slave device based on a time when the master device receives a response from that slave device. The master device can send the calculated network latency time value to each slave device for storage on each slave device. The master device can establish an audio playback session with the slave devices and send portions of an audio file as well as a playback timing instruction to each slave device, where the playback timing instruction can include a current system time of the master device. Each slave device can calculate a system clock offset value according to the current system time of the master device, the respective system time of each slave device, and the calculated network latency time value. According to embodiments, the master device can initiate playback of the audio file and the slave devices can initiate playback of the audio file according to their playback timing instructions as well as their calculated system clock offset values such that the audio playback can occur on both the master and slave devices with little or no delay issues.

In some embodiments, the master device and the slave devices can refine any sync discrepancies via manual input from a user or via automatic calculations based on hardware latency, elapsed time discrepancies, and/or playback of various audio sync data. Further, a master device or a slave device can modify the audio playback according to pause, fast forward, rewind, skip, and other playback commands received via a user interface and, in some cases, the slave device can switch roles with the master device according to various commands initiated from the slave device. In further embodiments, an additional slave device can join an existing audio session between a master device and one or more slave devices.

The embodiments as discussed herein offer a benefit to users by effectively and efficiently reducing or eliminating sync issues that can be experienced during "group audio" sessions. Instead of users having to manually sync audio playback from multiple devices, the embodiments offer techniques to sync electronic devices based on hardware and software latencies and network latencies and to issue playback instructions based on the syncing, thus improving playback timing. The embodiments further offer the benefit of manually and automatically adjusting timing parameters to improve synchronization accuracy. The users can therefore leverage the speakers from multiple device speakers to produce a more desirable listening experience, as the speakers of a single electronic device may not be capable of producing a preferred level of sound. Delays among the group of devices of less than 100 milliseconds, compared to another device, are acceptable under some circumstances, depending on the frequency (frequency response), amplitude (dynamic range), tempo, and other acoustic features of the audio recording. The manual and/or automatic adjustment of timing parameters may either reduce delays to improve absolute timing synchronization or increase delays to improve psychoacoustic perception of sound localization (e.g., left and right channel separation or auditory scene creation) or other desired effects (e.g., reverb and delay).

It should be noted that the disclosures in this specification are made and intended to be interpreted to their broadest extent under the patent laws, and that while the systems and methods described herein may be employed broadly in numerous applications and embodiments consistent with their capabilities, nothing in this disclosure is intended to teach, suggest, condone, or imply noncompliance with any other law or regulation that may be applicable to certain usages or implementations of the systems and methods. For example, while the systems and methods disclosed herein are technologically capable of copying, transmitting, and playback of media files and associated artwork or other metadata, such capabilities and functionalities should not be construed as a teaching, recommending, or suggesting use of such capabilities and functionalities in a manner that does not comply with all applicable existing laws and regulations, including without limitation, applicable national, state, and common law privacy or copyright laws. Again, such broad disclosure is intended for compliance with and interpretation under the patent laws and regulations.

The electronic devices as described herein utilize system clocks that facilitate the functionalities according to a "relative timing" approach, whereby timing commands are programmed and latencies are calculated based on the relative differences in clock readings and delays calculated therefrom. For example, a master electronic device can command a slave device to start playing an audio file 1.15 seconds after receipt. However, it should be appreciated that the electronic devices can similarly facilitate the functionalities according to an "absolute timing" approach, whereby timing commands are programmed and latencies are calculated based on readings from a common clock. For example, a master device and a slave device can access the same clock, and the master device can command the slave device to start playing an audio file at 12:59:59.55 pm.

FIG. 1 is an example representation 100 of electronic devices capable of group audio playback. As shown in FIG. 1, a group of users 101, 102, 103 having respective electronic devices 104, 105, 106 can be located within a proximity 107 to each other, as represented by the dashed circle. This proximity 107 may be bounded by the wireless communication range of at least one of the devices 104, 105, 106. Each of the electronic devices 104, 105, 106 may be, for example, a handheld wireless device, such as a mobile phone, a Personal Digital Assistant (PDA), a smart phone, a tablet or laptop computer, a multimedia player, an MP3 player, a digital broadcast receiver, a remote controller, or any other electronic apparatus. Although the embodiments envision the electronic devices 104, 105, 106 as portable and hand-held, it should be appreciated that other non-portable devices are envisioned. Each of the electronic devices 104, 105, 106 can optionally exchange information with a network 110, such as a cellular network, such as in cases in which one or more of the electronic devices 104, 105, 106 retrieves audio data from the network 110.

According to embodiments, the electronic devices 104, 105, 106 can connect to and communicate with each other via various wireless connections. For example, the electronic devices 104, 105, 106 can initially detect each other via near field communication (NFC). In particular, respective NFC components of the electronic devices 104, 105, 106 such as NFC tags and/or NFC chips can detect proximity with other NFC components and establish NFC connections using unique identifications. The electronic devices 104, 105, 106 can also include communication modules that enable the electronic devices 104, 105, 106 to wirelessly connect to each other, such as via a Wi-Fi Direct connection or a Wi-Fi connection.

In operation, the users 101, 102, 103 may wish to establish a "group play" of audio whereby external speakers of their respective electronic devices 104, 105, 106 are leveraged to simultaneously output audio. According to embodiments, the electronic devices 104, 105, 106 are configured to sync with each other based on network and/or hardware and software latencies, whereby one of the electronic devices 104, 105, 106 is deemed the master device and the remaining electronic devices are deemed slave devices. For purposes of explanation, assume that the electronic device 104 is the master device and the electronic devices 105, 106 are the slave devices. The master electronic device 104 can facilitate a syncing technique with the slave electronic devices 105, 106 to determining timing for audio playback. Further, the master electronic device 104 can select an audio file and send portions of the audio file to the slave electronic devices 105, 106 via the wireless connections. The master electronic device 104 can initiate playback of the audio file based on the syncing information and can send playback instructions for the audio file to the slave electronic devices 105, 106, where the playback instructions are also based on the syncing information.

In some embodiments, the electronic devices 104, 105, 106 can switch roles whereby a slave device can become a master device and vice-versa. For example, a slave device can select a new audio playlist which triggers a request to a master device for a role change. In other embodiments, an additional user 108 may wish to join his or her electronic device 109 to the audio playback session among the other electronic devices 104, 105, 106. When the additional electronic device 109 is within the proximity 107, the master device of the audio playback session can connect to the electronic device 109, facilitate the syncing technique to establish proper timing with the electronic device 109, and send appropriate audio file portions and playback timing instructions such that the electronic device 109 can output the audio file in sync with the other electronic devices 104, 105, 106. In some embodiments the additional electronic device 109 is invited to the group audio session through an NFC communication with one of the devices 104, 105, 106 already in the group audio session.

Figure 2:
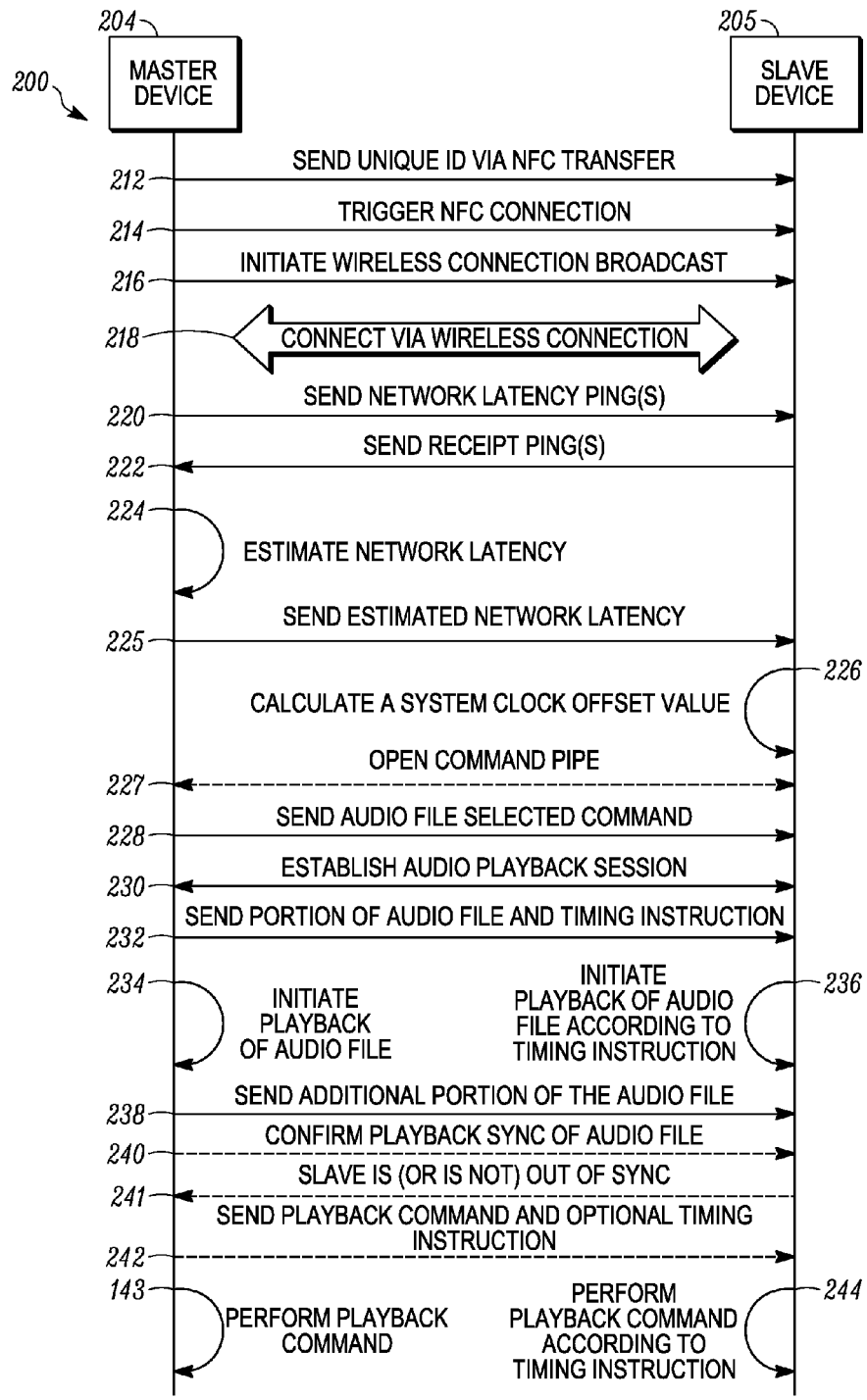
FIG. 2 depicts an example diagram associated with initiating audio playback on multiple electronic devices in accordance with some embodiments.

Referring to FIG. 2, depicted is an example diagram 200 associated with initiating audio playback in a master device 204 and a slave device 205. Although FIG. 2 depicts only the master device 204 and one slave device 205, it should be appreciated that the functionalities of the diagram 200 can be implemented with multiple slave devices. The audio playback initiating can begin with an NFC pairing whereby the master device 204 sends 212 a unique ID to the slave device 205 via an NFC transfer and triggers 214 an NFC connection complete response. In embodiments, the slave device 205 can send an NFC connection success message to the master device 204 to acknowledge reception of the unique ID.

The master device 204 can initiate 216 a wireless connection broadcast with the slave device 205 and the slave device 205 can connect 218 to the master device 204 via the wireless connection. In some embodiments, the master device 204 can broadcast a Wi-Fi Direct service containing the unique ID of the master device 204 as well as service types unique to the audio initiation so as not to collide with other Wi-Fi Direct services. Further, in some embodiments, the slave device 205 can broadcast its service as well as attempt to discover services and, when the slave device 205 finds a service that matches the unique ID of the master device 204, the slave device 205 can stop broadcasting its service and attempt to connect to the service of the master device 204. The master device 204 and the slave device 205 can further receive information about the connection (e.g., the IP address of the master device 204) so that the roles (i.e., which device is the master and which device is the slave) can be established. Further, the master device 204 and the slave device 205 can initiate or open any threads through one or more sockets and/or via TCP connections to facilitate data transfer. It should be appreciated that other wireless connections between the master device 204 and the slave device 205 are envisioned, such as a Wi-Fi connection.

Referring to FIG. 2, the master device 204 can send 220 a series of network latency pings to the slave device 205. Each of the pings can include a current system clock time as recorded by the master device 204. In some embodiments, the current system clock time can correspond to an elapsed time relative to how long the master device 204 has been powered on. Upon receipt of the network latency ping, the slave device 205 can compare the received system clock time from the master to its current clock time to determine a difference in clock times and save this difference to a memory. Further, the slave device 205 can send 222 a series of receipt pings to the master device 204 and the master device 204 can calculate 224 a network latency value based on a timing associated with the receipt of the receipt pings. In particular, the master device 204 can record a second system time corresponding to the time that the master device 204 receives the receipt ping and can calculate a round-trip network latency value based on the difference between the first system time and the second system time.

Additionally, the master device 204 can estimate the one-way network latency value as half the difference between the first system time and the second system time, or according to other calculations. In some further embodiments, the master device 204 can calculate the one-way network latency value based on averaging multiple network latency pings. According to embodiments, the master device 204 can send 225 the estimated one-way network latency value to the slave device 205.

The slave device 205 can calculate 226 a system clock offset value based on subtracting the estimated one-way network latency value received from the master device 204 from the difference in master and slave clock times previous saved by the slave device 205. According to some embodiments, the slave device 205 can optionally open 227 a command pipe with the master device 204 over which the slave device 205 can send various commands, for example commands to control playback of an audio file.

The master device 204 can select an audio file for playback and send 228 an "audio file selected" command to the slave device 205. In some embodiments, a user can select the audio file via a user interface of the master device 204. Further, the master device 204 can initiate a corresponding audio playback application to facilitate the audio playback and playback commands associated therewith. It should be appreciated that the audio file can be saved locally on the master device 204 or can be retrieved from a remote server via a network connection (see FIG. 1 element 110). For example, the master device 204 can "stream" an audio file from a remote server. The master device 204 and the slave device 205 can establish 230 an audio playback session via, for example, a dedicated connection using a thread command. The master device 204 can send 232 a portion of the audio file to the slave device 205 along with a timing instruction using the audio playback session, whereby the timing instruction can include the current system time for the master device 204. In some embodiments, the timing instruction can include a specified time to play, a playback position to seek, or a current playback position playing. For example, the timing command can instruct the slave device 205 to start playing the portion of the audio file in 0.75 seconds, to start playing the portion of the audio file 1.30 seconds after receipt, to start playing the audio file at an elapsed time of 00:25.02, or according to other relative timing parameters. In some embodiments, the slave device 205 can notify a user after the portion of the audio file is received.

The master device 204 can initiate 234 playback of the audio file and the slave device 205 can initiate 236 playback of the audio file according to the timing instruction as well as the system clock offset value calculated in 226. Accordingly, the respective audio output from the master device 204 and the slave device 205 can be synced based on the amount of time it takes for the master device 204 to send the audio file to the slave device 205 (i.e., the network latency or a modification thereof). The master device 204 can send 238 additional portion(s) of the audio file to the slave device 205 using the audio playback session, whereby the master device 204 and the slave device 205 can play the additional portion(s) as previously described with reference to 234, 236. The previously-sent timing instruction 232 may be applied to the additional portions of the audio file. Consequently, the playback of the audio file on the master device 204 and the slave device 205 can be continuous and uninterrupted.

In some embodiments, the master device 204 can optionally confirm 240 playback synchronization of the audio file at the slave device 205. In particular, the master device 204 can send an elapsed playback time of the audio file to the slave device 205 and the slave device 205 can compare the master elapsed playback time to its own elapsed playback time. If the difference in elapsed playback times exceeds a threshold amount (whereby the threshold amount is based on a predetermined threshold amount as well as the network latency value and/or timing instruction), any slave device 205 that is out of sync can send an indication 241 to the master device 204 that the playback is out of sync. If the playback is out of sync, this may trigger a re-performance of network latency estimations 220, 222, 224, 225, 226 with the out-of-sync slave device 205. The master device 204 and/or the out-of-sync slave device 205 can adjust the playback of the audio file to account for the discrepancy. For example, the master device 204 can delay its playback or can instruct the slave device 205 to increase its playback rate or skip to another portion of the audio file.

In some embodiments, the master device 204 can optionally send 242 a playback command as well as an optional timing instruction to the slave device. For example, a user of the master device 204 can select to pause, to fast forward or rewind the audio file (e.g., by dragging along a time line corresponding to the audio file playback and then releasing), or to skip to another audio file or another playlist. For further example, a user of the slave device 205 can make similar playback selections and the slave device 205 can send the selections as requests to the master device 204 to have the master device 204 modify the playback accordingly. The master device 204 can perform 243 the playback command. The slave device 205 can perform the playback command in compliance with the timing instruction and the system clock offset value, if applicable.

In some embodiments, the playback commands (e.g., fast forward, rewind, etc. as implemented by moving an indicator along a time line) can be a variant of confirming the playback synchronization per step 240. For example, assume that one second ago, 1:37 of the audio playback of a certain song had elapsed on the master device 204, and the user has adjusted a slider bar so that the audio playback is now at 2:00. Then, the master device 204 can send a confirmation 240 sync request to the slave device 205 indicating that the audio playback is at 2:00. The slave device 205 can receive the confirmation sync request and indicate 241 that the slave device 205 is "out of sync." Further, the slave device 205 can jump to the 2:00 mark of audio playback (plus any compensation for network delay and optionally acoustic delay), and the master device 204 and the slave device 205 can re-perform their network latency calculations 220, 222, 224, 225, 226.

Figure 3:
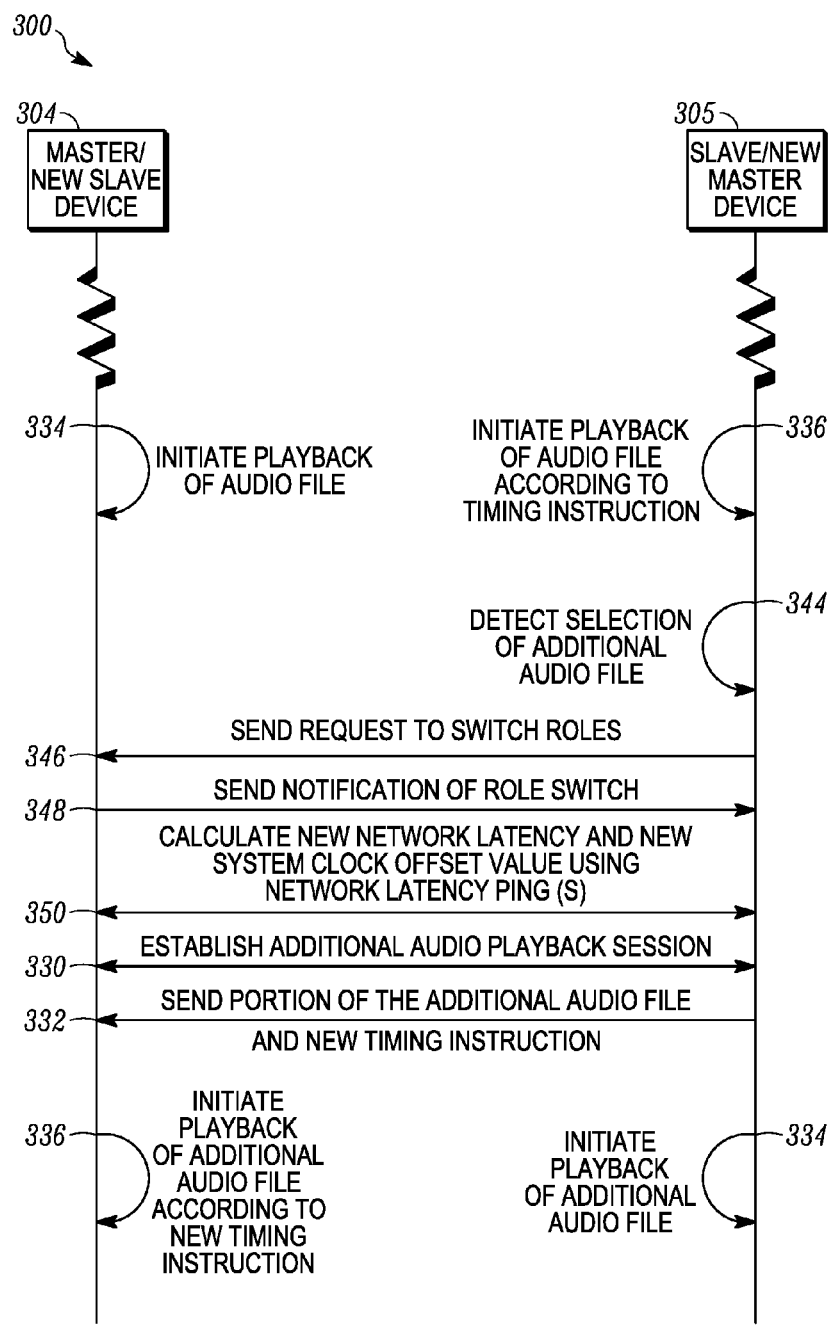
FIG. 3 depicts an example diagram associated with multiple electronic devices switching audio playback roles in accordance with some embodiments.

FIG. 3 depicts an example diagram 300 associated with a master device 304 and a slave device 305 switching roles. Although FIG. 3 depicts only the master device 304 and one slave device 305, it should be appreciated that the functionalities of the diagram 300 can be implemented with multiple slave devices. Further, it can be assumed that the master device 304 and the slave device 305 have established a wireless connection and an audio playback session, as previously described with respect to FIG. 2. According to embodiments, the master device 304 and the slave device 305 can offer the same playback commands (see FIGS. 6 and 7), however for the slave device 305 to become the new master device, a user of the slave device 305 independently selects a new audio file, playlist, or the like.

As shown in FIG. 3, the master device 304 can initiate 334 playback of an audio file (similar to 234 as described with respect to FIG. 2) and the slave device 305 can initiate 336 playback of the audio file according to a timing instruction as well as the system clock offset value (similar to 236 as described with respect to FIG. 2).

The slave device 305 can detect 344 a selection of an additional audio file, where the selection triggers a role change wherein the slave device 305 can become the new master device and the master device 304 can become the new slave device. For example, the selection of the additional audio file can be an audio file or playlist of audio files stored on the slave device 305 or otherwise accessible by the slave device 305. The slave device 305 can send 346 a request to switch roles to the master device 304 and the master device 304 can send 348 a notification of the role switch to the slave device 305. Upon receipt of the notification, the slave device 305 (now the new master device) can calculate 350 a new network latency value and a new system clock offset value with the master device 304 (now the new slave device) via a series of network latency pings and calculations, similar to 220, 222, 224, 225, 226 as discussed with respect to FIG. 2.

The new master device 305 can establish 330 an additional audio playback session with the new slave device 304, similar to 230 as discussed with respect to FIG. 2. The new master device 305 can send 332 a portion of the additional audio file to the new slave device as well as a new timing instruction using the additional audio playback session, whereby the new timing instruction can include a current system time of the new master device 305. The new master device 305 can initiate 334 playback of the additional audio file and the new slave device 304 can initiate 336 playback of the additional audio file according to the new timing instruction as well as the new system clock offset value resulting from 350, similar to 234 and 236 as discussed with respect to FIG. 2. Thus the old slave device 305 becomes the new master device whereby the playback commands 242, the sync confirmations 240, 241, and the additional audio file portions transmittals 238 are still active, but now for the new master device.

Figure 4:
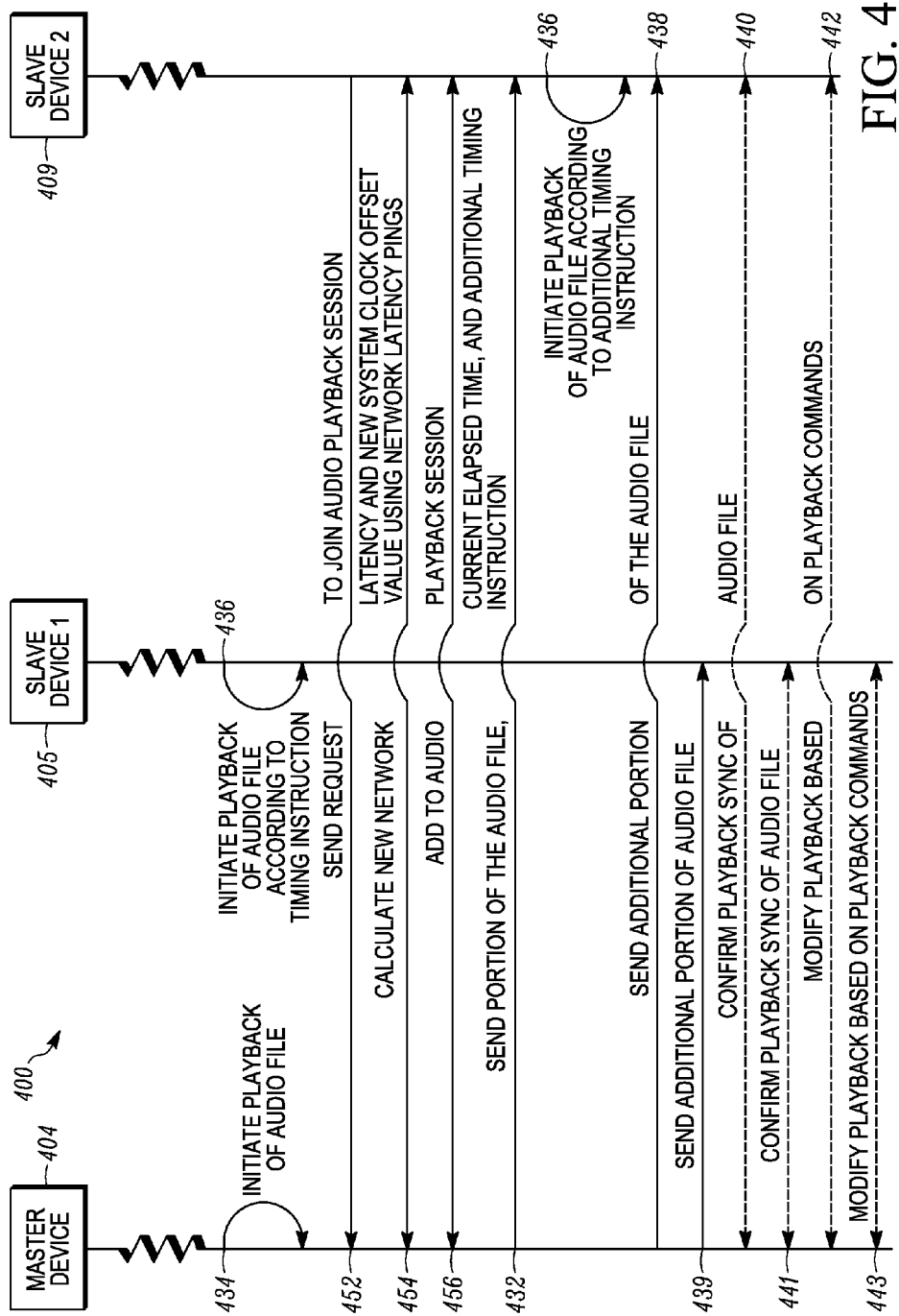
FIG. 4 depicts an example diagram associated with adding an electronic device to an audio playback session in accordance with some embodiments.

FIG. 4 depicts an example diagram 400 associated with a new slave device 409 joining an existing audio session between a master device 404 and a slave device 405. It can be assumed that the master device 404 and the slave device 405 have established a wireless connection and an audio playback session, as previously described with respect to FIG. 2. As shown in FIG. 4, the master device 404 can initiate 434 playback of an audio file (similar to 234 as described with respect to FIG. 2) and the slave device 405 can initiate 436 playback of the audio file according to a timing instruction (similar to 236 as described with respect to FIG. 2).

When within the proximity 107, the new slave device 409 can send 452 a request to the master device 404 to join the audio playback session between the master device 404 and the slave device 405. The master device 404 can calculate 454 a new network latency value and a new system clock offset value with the slave device 406 via a series of network latency pings and calculations, similar to 220, 222, 224, 225, 226 as discussed with respect to FIG. 2. The master device 404 can add 456 the slave device 409 to the audio playback session and can send 432 a portion of the audio file, a current elapsed time of the audio file playback, and an additional timing instruction to the slave device 406 using the audio playback session, whereby the additional timing instruction can include the current system time for the master device 404. The slave device 409 can initiate 436 playback of the audio file at the current elapsed time according to the additional timing instruction as well as the new system clock offset value. Meanwhile the master device 404 may initiate 234 playback of that portion of audio file, and the first slave device 405 may initiate 236 playback of that portion of the audio file according to its timing instruction and system clock offset value.

As shown in FIG. 4, the master device 404 can send 438, 439 an additional portion of the audio file to the slave device 405 and the slave device 409 for playback on the respective slave devices 405, 406, as discussed with respect to 238 of FIG. 2. In some embodiments, the master device 404 can send an additional timing instruction associated with the additional portion. The master device 404 can optionally confirm playback sync 440, 441, of the audio file with the slave device 405 and the slave device 406, as discussed with respect to 240, 241 of FIG. 2. In addition, the master device 404 can optionally modify 442, 443 playback of the audio file based on playback commands received by the master device 404, the slave device 405, and/or the slave device 409, as discussed with respect to 242, 243, 244 of FIG. 2. For example, a user of the slave device 409 can request to pause playback of the audio file, whereby the slave device 409 can send a pause command request to the master device 404 and the master device can pause its own playback as well as send a pause command to the slave devices 405, 409 to pause playback.

The embodiments as discussed herein can account for an audio latency for in-device hardware and software computing delays (a computing audio latency) plus an acoustic "through air" delay, which excludes estimated network latency delay. This audio latency can be determined using audio sync data playback and at least one microphone of one of the devices. In some embodiments, when two devices initially form a group audio session, the NFC pairing can trigger a wireless connection and an initial network delay measurement as well as trigger an audio sync measurement process to determine an audio latency delay between the two devices. The audio sync measurement process, which can initiate while the devices are close to each other (e.g., within a short NFC range), can utilize the initial network delay ping results to instruct playback of orthogonal audio sync data at the same time (based on network delay compensation) by both devices. The orthogonal audio sync data waveforms may be designed to include a wide frequency response and create a pleasant audio-feedback sound so that users recognize that a new device has joined the group audio session (e.g., an up-chirp played by one device and a down-chirp played by another device). Alternately, the audio sync data may sound like different types of noise (e.g., white noise played by one device and brown noise played by another device). Other types of orthogonal audio sync data may also be used.

The master device can cross-correlate the audio from both devices as received at its microphone and can determine the differences between the audio latency delay for the master device and the slave device. The master device can give the slave device a compensation value for the audio latency delay so that the slave device can make its own adjustments during playback, or the master device can use the network delay and the audio latency delay difference values to calculate updated timing instructions for audio playback. Alternately or additionally, the slave device may independently cross-correlate the audio from both devices as received at its microphone and determine the audio latency delay for itself. The slave could then report its determined audio latency delay difference to the master device as well as report its device model (e.g., Motorola DROID RAZR MAXX).

It should be appreciated that additional devices may join the group audio session via the NFC connection. The NFC touch can be with any device currently in the group audio session (e.g., either the master device or a slave device). The NFC detection can trigger a wireless connection and initial network delay measurement and can trigger an audio sync measurement process between the additional device and the "inviting" device that is already in the group audio session as described previously. In case additional devices join via a series of slave devices (e.g., a daisy chain of additional devices), a table of device models may be created by the master device and used to normalize the hardware and software delay plus the acoustic "through air" delay difference values on the assumption that devices of the same model would have similar hardware and software delays plus similar acoustic "through air" delays.

Figure 5:
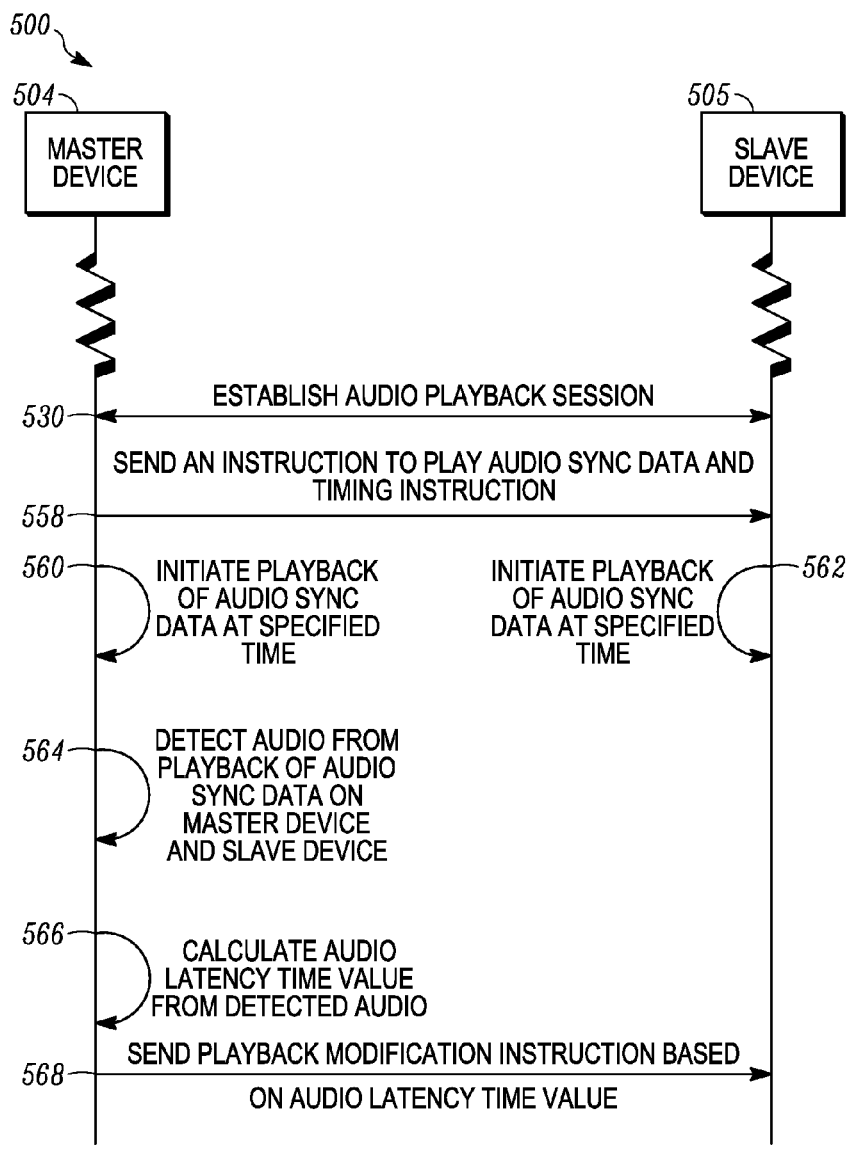
FIG. 5 depicts an example diagram associated with synchronizing multiple electronic devices in accordance with some embodiments.

FIG. 5 depicts an example diagram 500 associated with a master device 504 and one slave device 505 facilitating the audio sync measurement process to measure audio latency delay, which includes hardware and software plus acoustic "through the air" delays and does not include network latency. Although FIG. 5 depicts only the master device 504 and the slave device 505, it should be appreciated that the functionalities of the diagram 500 can be implemented with multiple slave devices. Further, it can be assumed that the master device 504 and the slave device 505 have established a wireless connection or otherwise that the master device 504 has initiated the wireless connection broadcast. As shown in FIG. 5, the master device 504 can establish 530 an audio playback session with the slave device 505, similar to 230 as described with respect to FIG. 2. To perform the audio latency measurement, the master device 504 can send 558 an instruction to play audio sync data as well as a corresponding timing instruction indicating a specified time to the slave device 505 using the audio playback session. In some embodiments, the audio sync data can be a chirp (such as an up-chirp or a down-chirp) that can be used to gauge device hardware, device software, and "through the air" audio latencies (i.e., not network latencies) and/or frequency response measurements.

The master device 504 can initiate 560 playback of the audio sync data at the specified time after the master device 504 wirelessly connects (e.g., via an NFC pairing) to the slave device 505, and the slave device 505 can initiate 562 playback of the audio sync data at the specified time after the master device 504 connects to the slave device 505. The master device 504 can leverage an audio input component (e.g., a microphone) to detect 564 audio from playback of the audio sync data on the master device 504 and the slave device 505. Further, the master device 504 can calculate 566 an audio latency time value from the detected audio using, for example, a cross-correlation function. In particular, the audio latency time value can reflect any computing audio latency plus acoustic "through the air" delay in the respective audio sync data playbacks on the master device 504 and the slave device 505. In some embodiments, such as if the audio sync data is a chirp, the master device 504 can calculate new frequency values based on respective frequency response measurements of the master device 504 and/or the slave device 505.

Although not depicted in FIG. 5, it should be appreciated that the slave device 505 can detect the audio sync data playbacks (for example via a microphone of the slave device 505), independently calculate an audio latency time value, and adjust its audio playback timing accordingly. The master device 504 can send 568 to the slave device 505 a playback modification instruction based on the slave's calculated audio latency time value, the master's calculated audio latency time value, or a combination of the master's and the slave's calculated audio latency time value, and the slave device 505 can modify its playback of audio files accordingly.

In some embodiments, audio playback the group of devices can be modified based on the detected audio frequency response and the dynamic range of each device. For example, one device may have a good bass frequency response and another device may have a good treble frequency response. The comparative "good/better" frequency response of each device's audio speakers may be detected during the audio sync measurement process. As a result, the master device may provide the audio data and timing instructions as well as frequency playback instructions and/or volume instructions.

Figure 6:
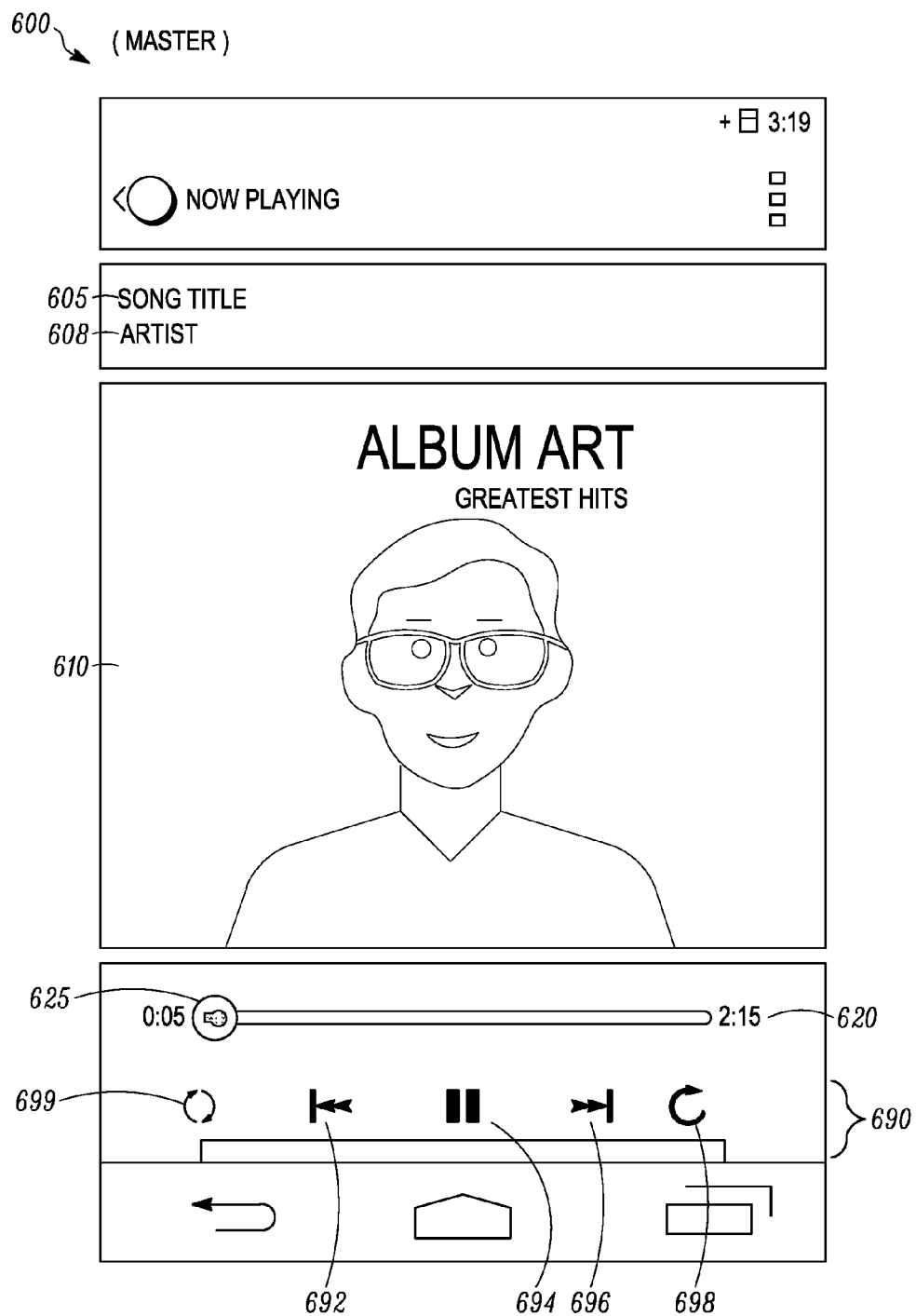
FIGS. 6-11 depict example interfaces associated with an audio playback application in accordance with some embodiments.

FIGS. 6-11 depict example interfaces associated with an audio playback application in accordance with some embodiments. According to embodiments, each of the master and the slave device(s) can execute the audio playback application and display the example interfaces on respective user interfaces. FIG. 6 depicts an example interface 600 that a master device can display on a user interface. The interface 600 indicates an audio file that the master device can play, and can indicate metadata associated with the audio file such as song title 605, artist 608, album artwork 610, total file play time 620, elapsed file play time 625, and/or other data. The interface 600 further includes various playback selections 690 that correspond to playback commands that can be selected by a user of the master device. For example as shown in FIG. 6, the playback selections 690 include a previous track selection 692, a pause (or play) selection 694, a next track selection 696, and a repeat selection 698. The interface 600 also includes a re-sync selection 699 that, when selected, causes the master device to issue a command to each slave device to send respective current playback locations. The interface 600 additionally indicates a progress of the audio track playback 625 and enables the user to navigate to other playback points of the audio track.

Figure 7:
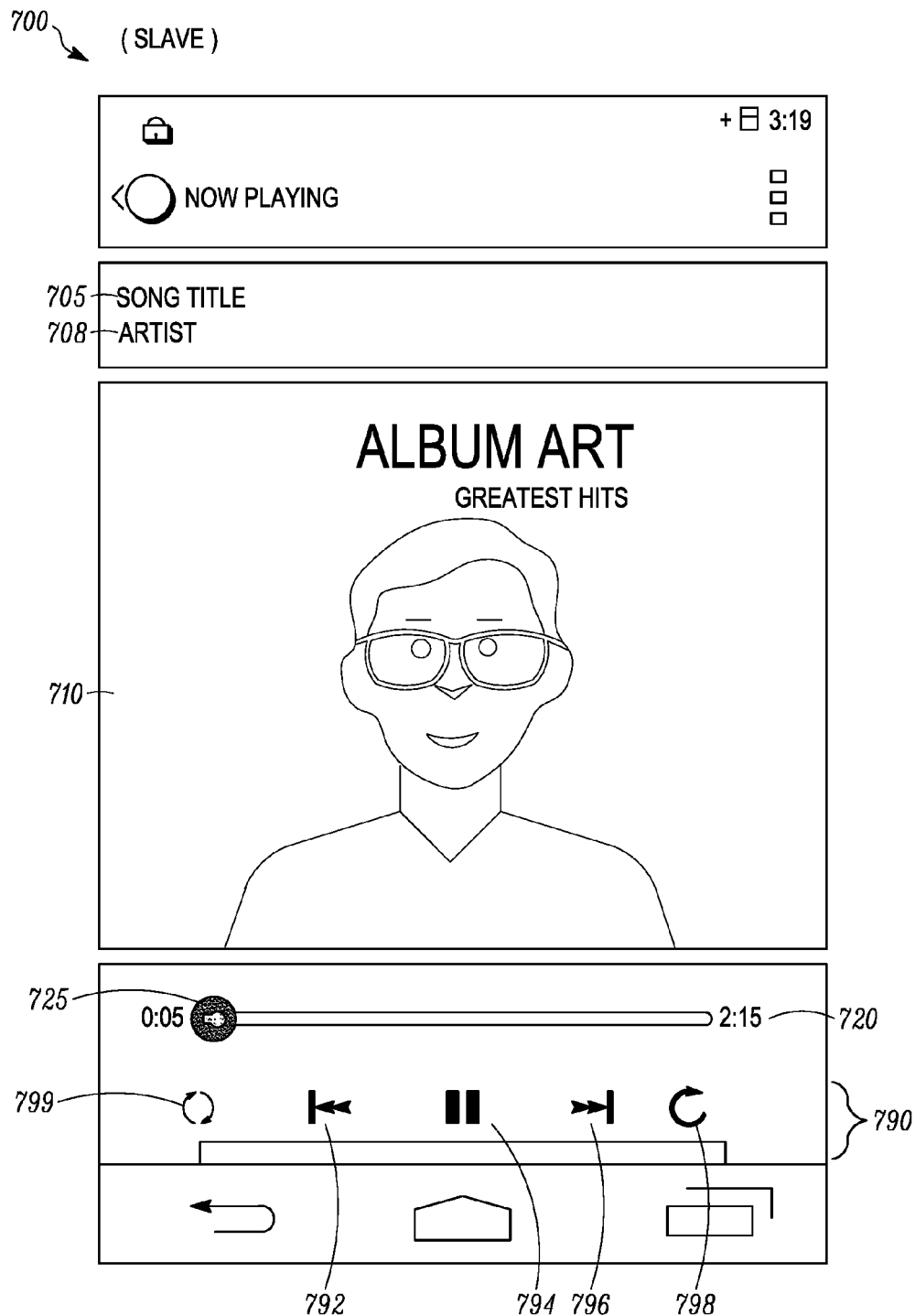

Referring to FIG. 7, depicted is an example interface 700 that a slave device can display on a user interface. The interface 700 includes the same or similar content as the interface 600, including playback selections 790 that mirror the playback selections 690 and enable a user of the slave device to request control playback of the audio file(s). Accordingly, the users of slave devices can view the same currently playing content and information 705, 708, 710, 720, 725 as the user of the master device, as well as effectively control playback 792, 794, 796, 798 of the audio files in a similar manner as the user of the master device. The interface 700 also includes a re-sync selection 799 that, when selected, causes the slave device and its master device to repeat the network latency pings and system clock offset value calculations. Although not depicted in FIGS. 6 and 7, it should be appreciated that other playback selections or controls are envisioned.

Figure 8:
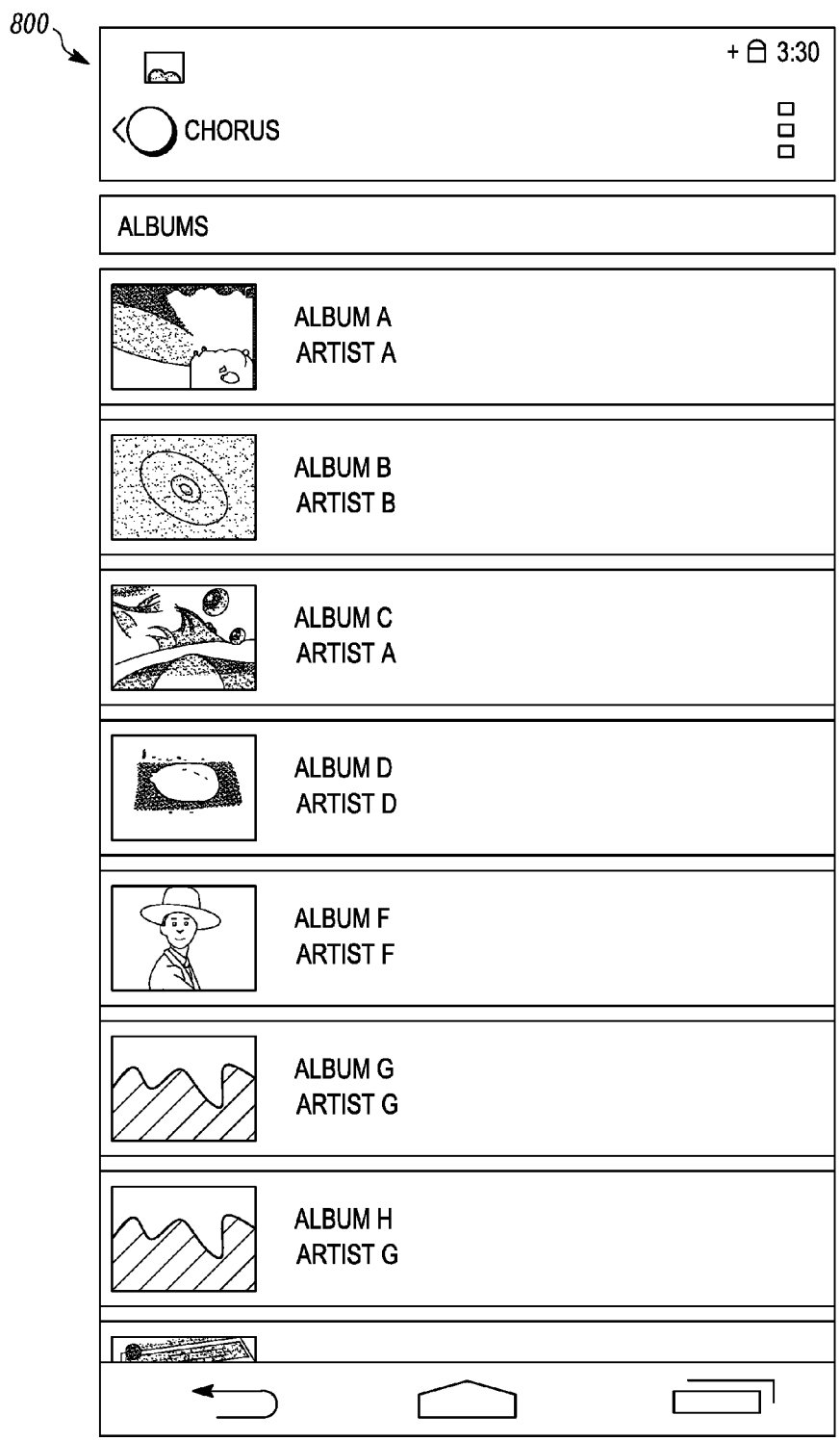
Figure 9:
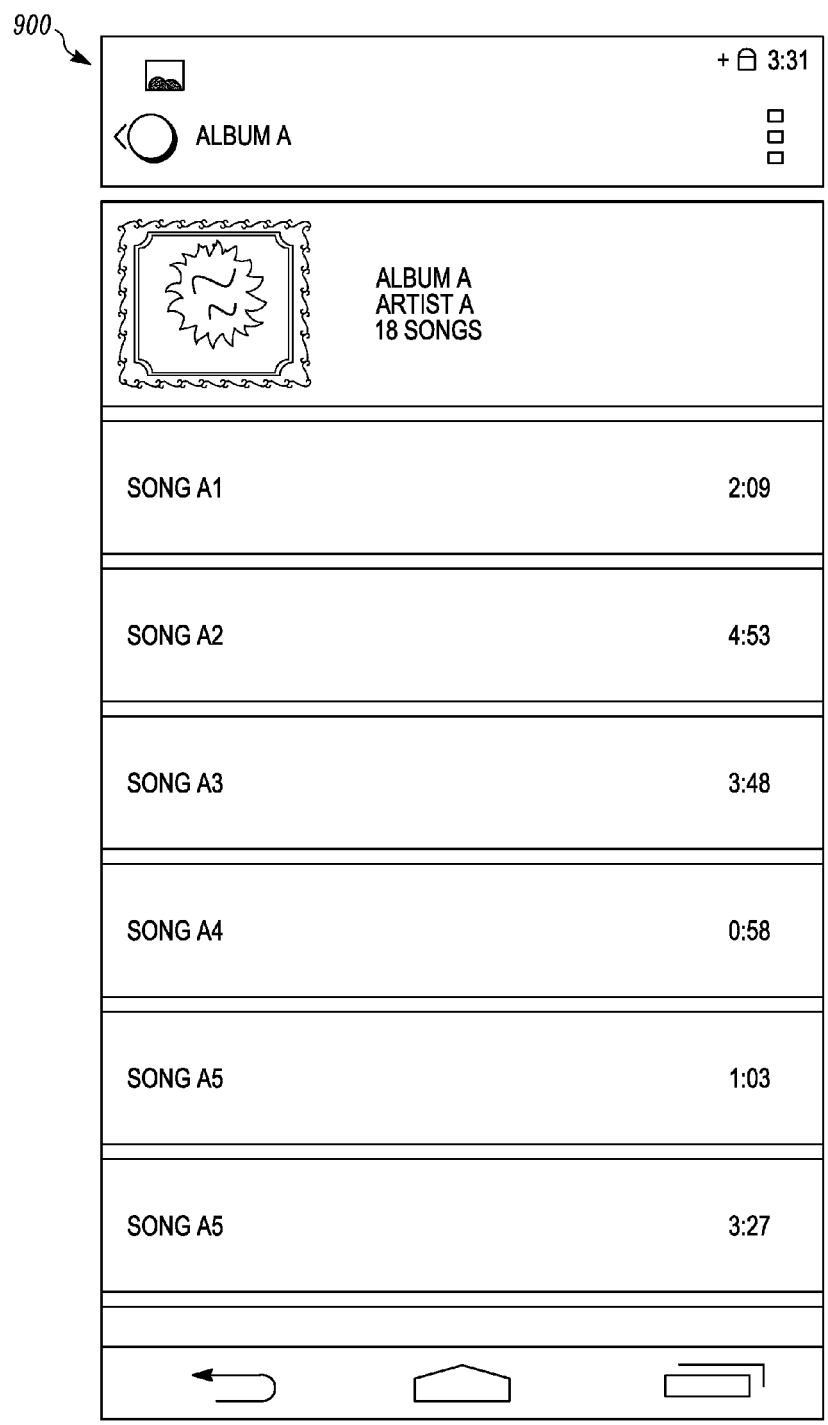
Figure 10:
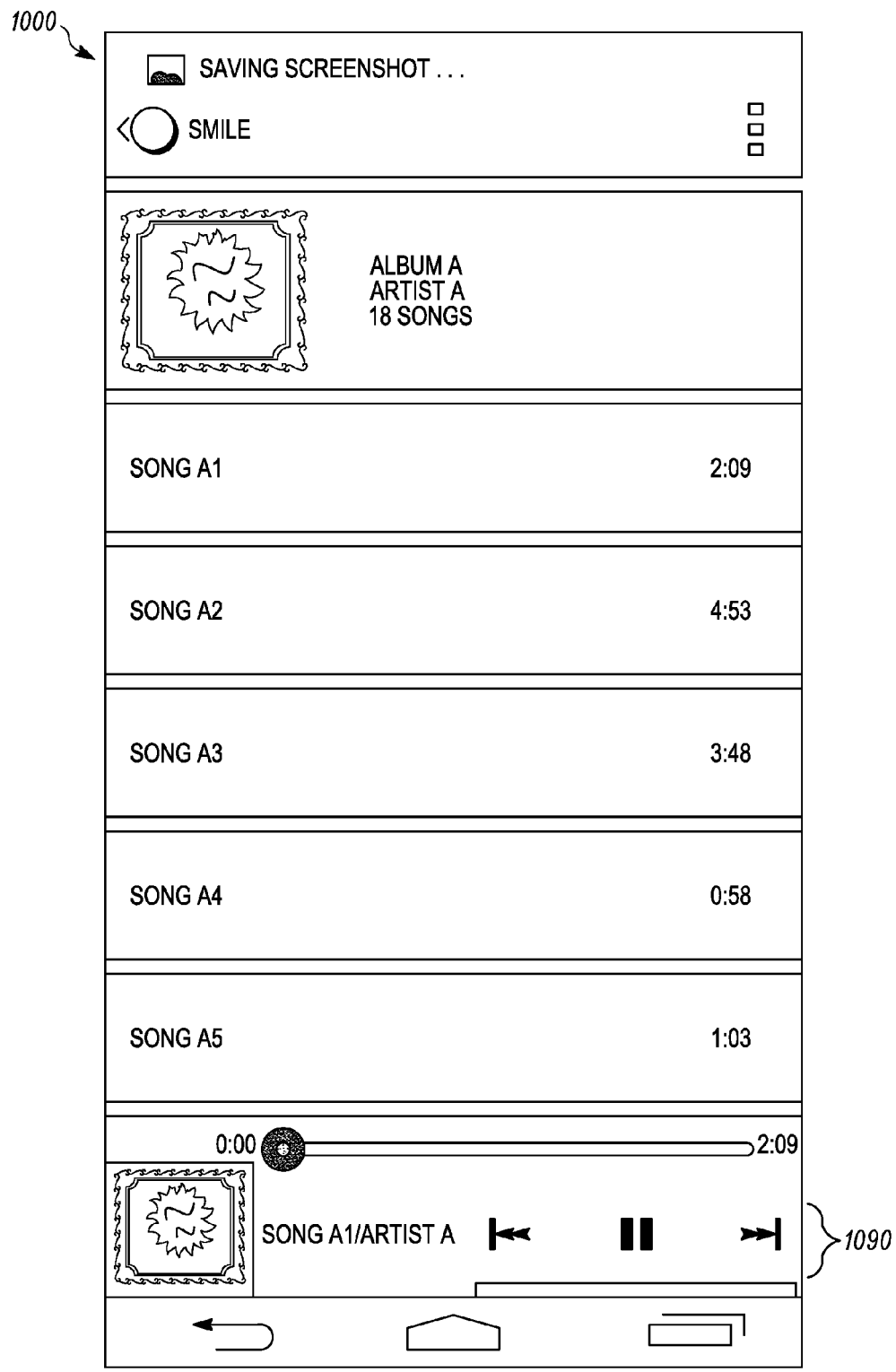

Referring to FIG. 8, depicted is an example interface 800 that a slave device and/or a master device can display on a user interface. The interface 800 enables a user to browse and/or select various albums that are available for playback. It should be appreciated that various gestures, such as scrolling, are supported to enable the user to navigate through the interface 800. If a user selects one of the albums of the interface 800, the slave device and/or the master device can display details for the selected album, for example as shown in an interface 900 of FIG. 9. Referring to FIG. 9, the interface 900 displays details for the album "Album A" by Artist A. The interface 900 includes selections for the songs on the album "Album A" and enables the user to select one or more of the songs for playback. For example, referring to FIG. 10, an interface 1000 depicts a playback of the song "Song A1" that the user has selected from the album details. As shown in FIG. 10, the interface 1000 includes playback selections 1090 that enable the user to control playback of the song and to navigate to other songs. It should be appreciated that a slave device and/or a master device can display the interface 1000.

Figure 11:
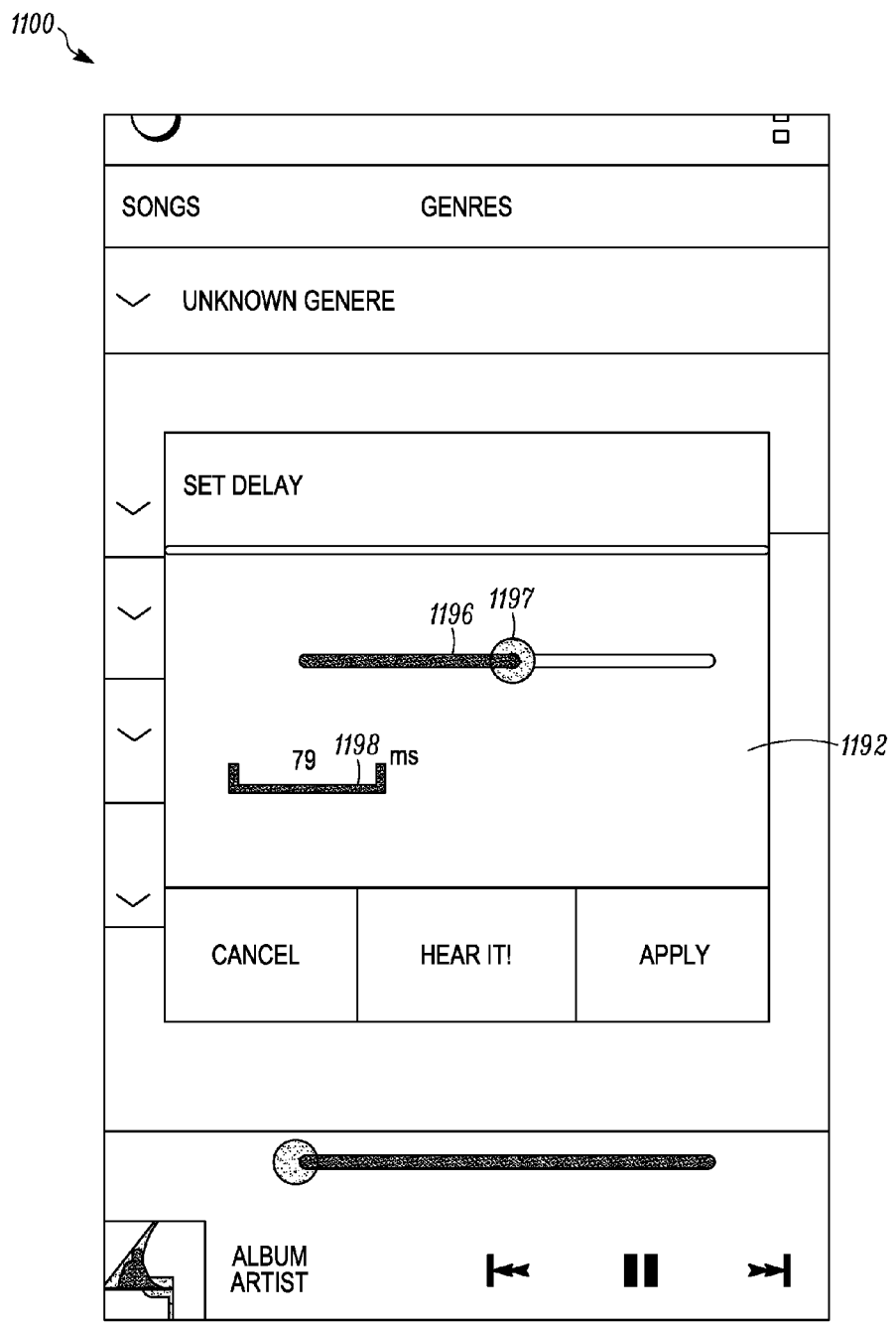

Referring to FIG. 11, depicted is a detailed interface 1100 capable of being displayed by a slave device and/or a master device. The interface 1110 includes an audio latency adjuster 1192 that enables the user of the slave device and/or the master device to adjust playback timing for the respective device. According to embodiments, the device can have an audio latency time value that represents an elapsed time for audio to propagate through the device from its controller module or processor to the output component or speaker as detected by a microphone of the device, and the audio latency adjuster 1192 enables the user to add or subtract time from this value to sync playback of the audio.

In some cases as shown in FIG. 11, the audio latency adjuster 1192 can indicate the calculated audio latency time value for the device (as shown: 79 ms) as the center of a sliding adjuster 1196 with a selector 1197 overlaid thereon. The user of the device can adjust the selector 1197 to add (e.g., by sliding to the right) or subtract (e.g., by sliding to the left) time that the device can add to or subtract from any playback timing instructions. For example, if the user slides the selector 1197 to the right side of the sliding adjustor 1196, the device can add a corresponding amount of milliseconds to the playback timing instructions, which can be shown as an updated number in the text box 1198. As an alternate adjustment, a user may type a number directly in the text box 1198. It should be appreciated that the master device can, according to any adjustments on the audio latency adjuster 1192, adjust its own playback timing or can send instructions to the slave device to adjust its playback timing. Further, it should be appreciated that the slave device can adjust its own playback timing according to any adjustments on its own audio latency adjuster 1192. Although the audio latency adjuster 1192 as shown in FIG. 11 has a range of 100 ms with example values, it should be appreciated that other ranges and values are envisioned. In some embodiments, the user can use the audio latency adjuster 1192 adjustments to produce a "bigger" sound or to introduce a reverb effect.

Figure 12A:
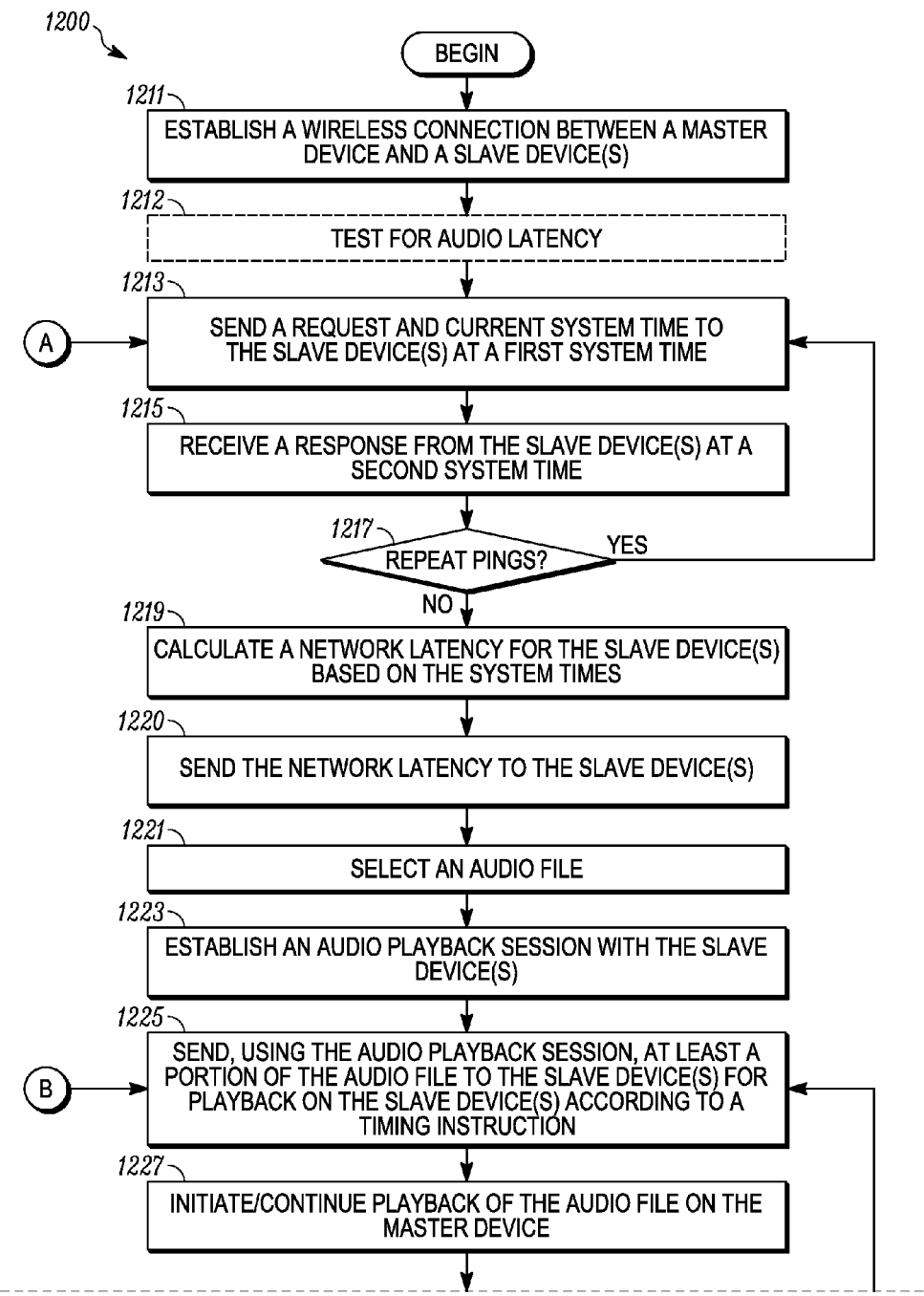
FIGS. 12A and 12B depict a flow diagram of initiating audio playback on multiple electronic devices in accordance with some embodiments.
Figure 12B:
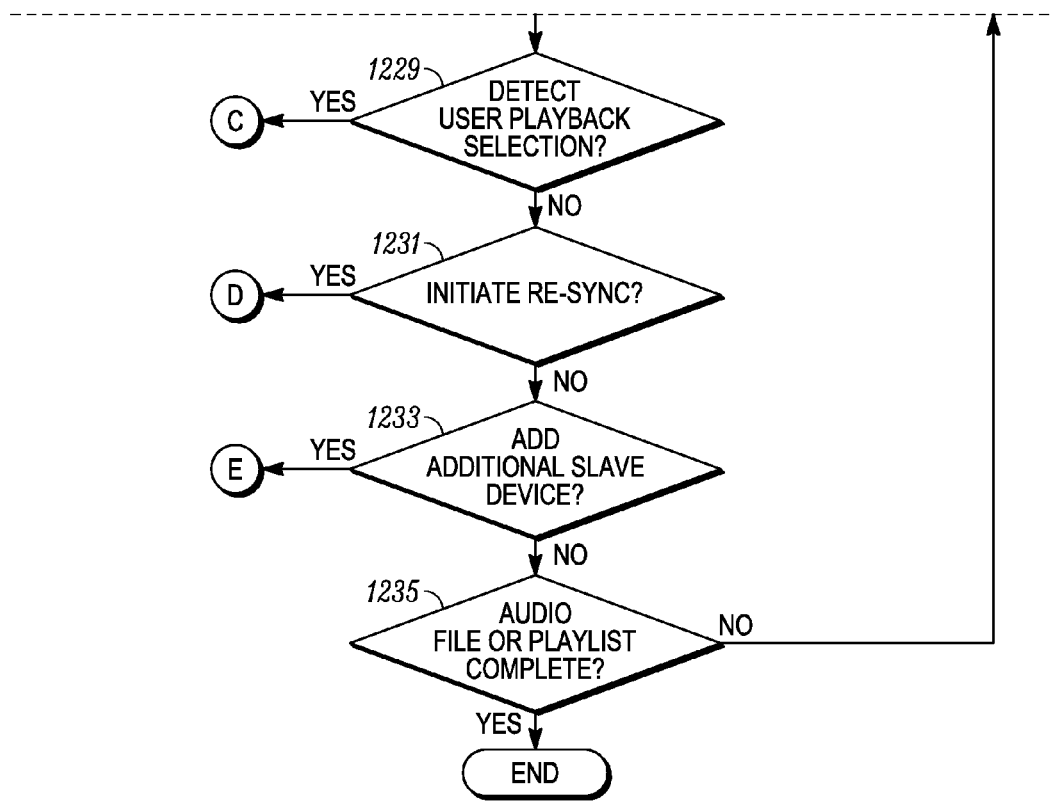

FIG. 12 is a flowchart of a method 1200 for a master electronic device to facilitate audio playback on multiple electronic devices. The method 1200 begins with the master device establishing 1211 a wireless connection between itself and one or more slave devices. According to embodiments, the wireless connection can be established via an NFC pairing and/or a Wi-Fi Direct or other wireless connection. Because the master device is in close proximity to the one or more slave devices, the master device can optionally test 1212 for any hardware and software latency or acoustic delay via audio received by a microphone of the master device, as discussed herein with respect to measuring an acoustic latency time value. The master device can send 1213 a network latency request along with its current system time to the slave device(s) at a first system time. According to embodiments, the slave device(s) can store the current system time of the master device. The master device can receive 1215 a response from the slave device(s) at a second system time. In embodiments, the response can include a confirmation that the slave device(s) received the request. The master device can determine 1217 whether to repeat the network latency requests. If the master device determines to repeat the network latency requests ("YES"), processing can return to 1213. If the master device determines to not repeat the network latency requests ("NO"), the master device can calculate 1219 a one-way network latency for the slave device(s) based on the system times. In some embodiments in which there are multiple slave devices, the master device can determine different network latencies for respective slave devices based on the responses from the multiple slave devices and optionally add acoustic latencies. In embodiments, the master device can send 1220 the additional one-way network latency to the slave device(s), which the slave device(s) can use along with the stored system time for the master device and its own system time to calculate a system clock offset value(s). In embodiments, the master device can send respective network latencies to respective slave devices to eliminate lag from the system clock offset value calculation performed by the slave devices.

The master device can select 1221 an audio file. In some cases, a user of the master device can select the audio file via a user interface. The master device can establish 1223 an audio playback session with the slave device(s) using the wireless connection. The master device can send 1225, using the audio playback session, at least a portion of the audio file to the slave device(s) for playback on the slave device(s) according to a timing instruction that can include a current system time of the master device. According to embodiments, the slave device(s) can use the current system time of the master device along with the previously-calculated system clock offset value to schedule or initiate playback of the portion of the audio file. According to embodiments, the timing instruction can be the same for each slave device and can include a specified time to play, a playback position to seek, a current playback position playing, or the like. For example, the timing instruction can instruct the slave device to start playback of the portion of the audio file in 1.43 seconds, or 0.21 seconds after receipt, or at a playback position of 00:01.35 seconds, or according to other relative times. The master device can initiate or continue 1227 playback of the audio file. The slave device can also initiate or continue playback of the audio file according to the timing instruction as well as a calculated difference in system times of the master device and the slave device.

The master device can determine 1229 if a playback selection is detected. If a playback selection is not detected ("NO"), the master device determines 1231 if the synchronization should be confirmed. In embodiments, either the master device or the slave device(s) (or users thereof) can initiate the confirmation request. If the sync confirmation has not been initiated ("NO"), the master device determines 1233 whether to add an additional slave device, such as if an additional slave device has requested to join the audio playback session. If the master device determines that there are no additional slave devices to add ("NO"), the master device can determine 1235 whether the audio file or a playlist that includes the audio file is complete. If the audio file or the playlist is not complete ("NO"), processing can return to 1225 in which the master device can send an additional portion of the audio file to the slave device(s) or can send a portion of an additional audio file (such as an additional audio file of the playlist) to the slave device(s). If the audio file or the playlist is complete in 1235 ("YES"), processing can end, repeat, or return or proceed to any other functionality.

Figure 13:
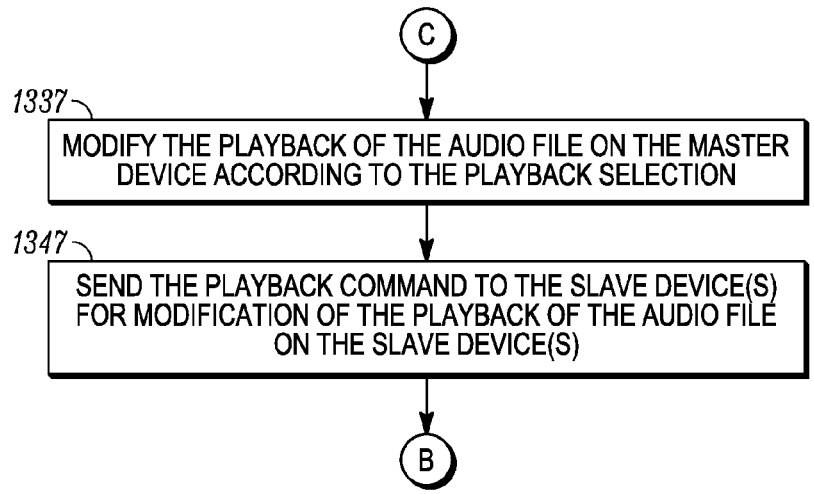
FIG. 13 depicts a flow diagram of initiating modifying audio playback on multiple electronic devices in accordance with some embodiments.

If the master device detects a playback selection in 1229 ("YES"), processing can proceed to "C" as detailed in FIG. 13. In embodiments, the playback command can correspond to pause, play, rewind, fast forward, or the like, and can be detected via a user interface of the master device or as a request received from the slave device. The master device can modify 1337 the playback of the audio file according to the playback selection. Further, the master device can send 1347 the playback command to the slave device(s) for modification of the playback of the audio file on the slave device(s). For example, if the playback command is a pause command, the master device can pause its playback of the audio file and also send a command to the slave device(s) to pause its respective playback(s). In embodiments, processing can proceed to "B" (i.e., 1225 of FIG. 12) or to any other functionality.

Figure 14:
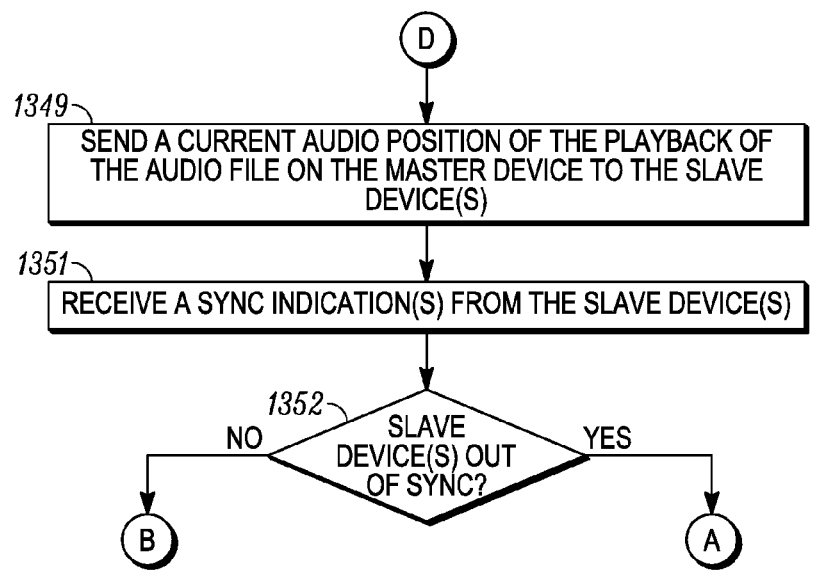
FIG. 14 depicts a flow diagram of syncing audio playback on multiple devices in accordance with some embodiments.

If the master device detects a request to confirm synchronization in 1231 ("YES"), processing can proceed to "D" as detailed in FIG. 14. In particular, the master device can send 1349 a current audio position of the playback of the audio file to the slave device(s), along with a request to determine whether a respective slave device is out of sync. According to embodiments, the slave device(s) can compare the current audio position to its own elapsed playback position to determine whether its playback is out of sync with the playback of the master device. The master device can receive 1351 a sync indication from the slave device(s). The master device can examine the sync indication to determine 1352 if the slave device(s) is out of sync. If the slave device(s) is not of out sync (i.e., the slave device(s) is in sync) ("NO"), processing can proceed to "B" (i.e., 1225 of FIG. 12) or to any other functionality. In contrast, if the slave device(s) is out of sync ("YES"), processing can proceed to "A" (i.e., 1213 of FIG. 12) or to any other functionality.

Figure 15:
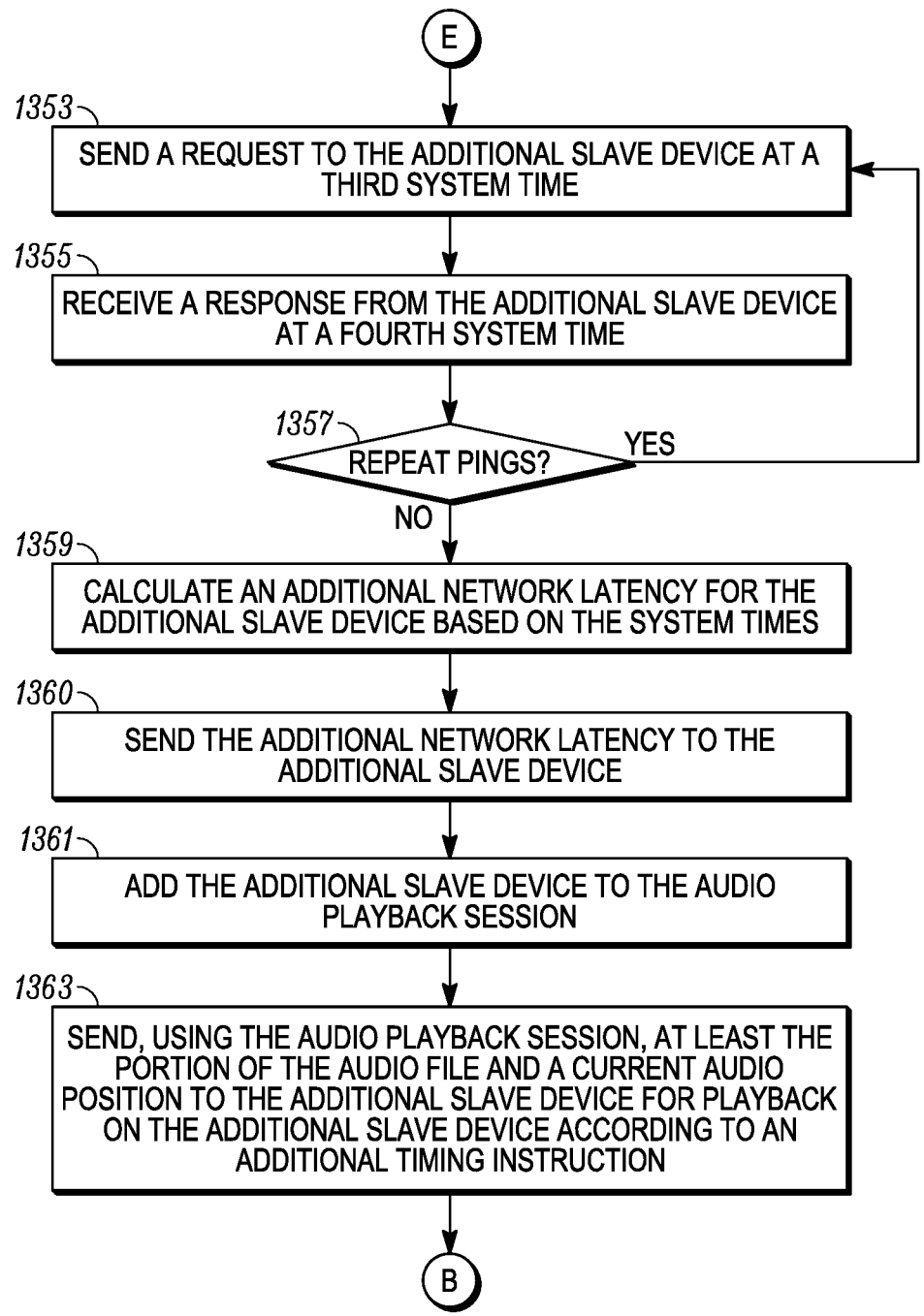
FIG. 15 depicts a flow diagram of adding an electronic device to an audio playback session in accordance with some embodiments.

If the master device determines to add an additional slave device in 1233 ("YES"), such as if the additional slave device requests to join the audio session, processing can proceed to "E" as detailed in FIG. 15. In particular, the master device can send 1353 a network latency request containing a third system time (i.e., the current system time of the master device) to the additional slave device at the third system time. According to embodiments, the additional slave device can store the third system time. The master device can receive 1355 a response from the additional slave device at a fourth system time. In embodiments, the response can include a confirmation that the additional slave device received the request. The master device can determine 1357 whether to repeat the network latency requests. If the master device determines to repeat the network latency requests ("YES"), processing can return to 1353. If the master device determines to not repeat the network latency requests ("NO"), the master device can calculate 1359 an additional one-way network latency for the additional slave device based on the system times. In embodiments, the master device can send 1360 the additional one-way network latency to the additional slave device, which the additional slave device can use along with the stored system time for the master device and its own system time to calculate an additional system clock offset value.

The master device can add 1361 the additional slave device to the audio playback session, such as via a socket of the additional slave device. The master device sends 1363, using the audio playback session, at least the portion of the audio file to the additional slave device for playback on the additional slave device according to an additional timing instruction that can include a current system time of the master device. The additional slave device can use this current system time of the master device along with the previously-calculated system clock offset value to schedule or initiate playback of the portion of the audio file. According to embodiments, the additional timing instruction can include a specified time to play, a playback position to seek, a current playback position playing, or the like. In embodiments, processing can proceed to "B" (i.e., 1225 of FIG. 12) or to any other functionality.

Figure 16:
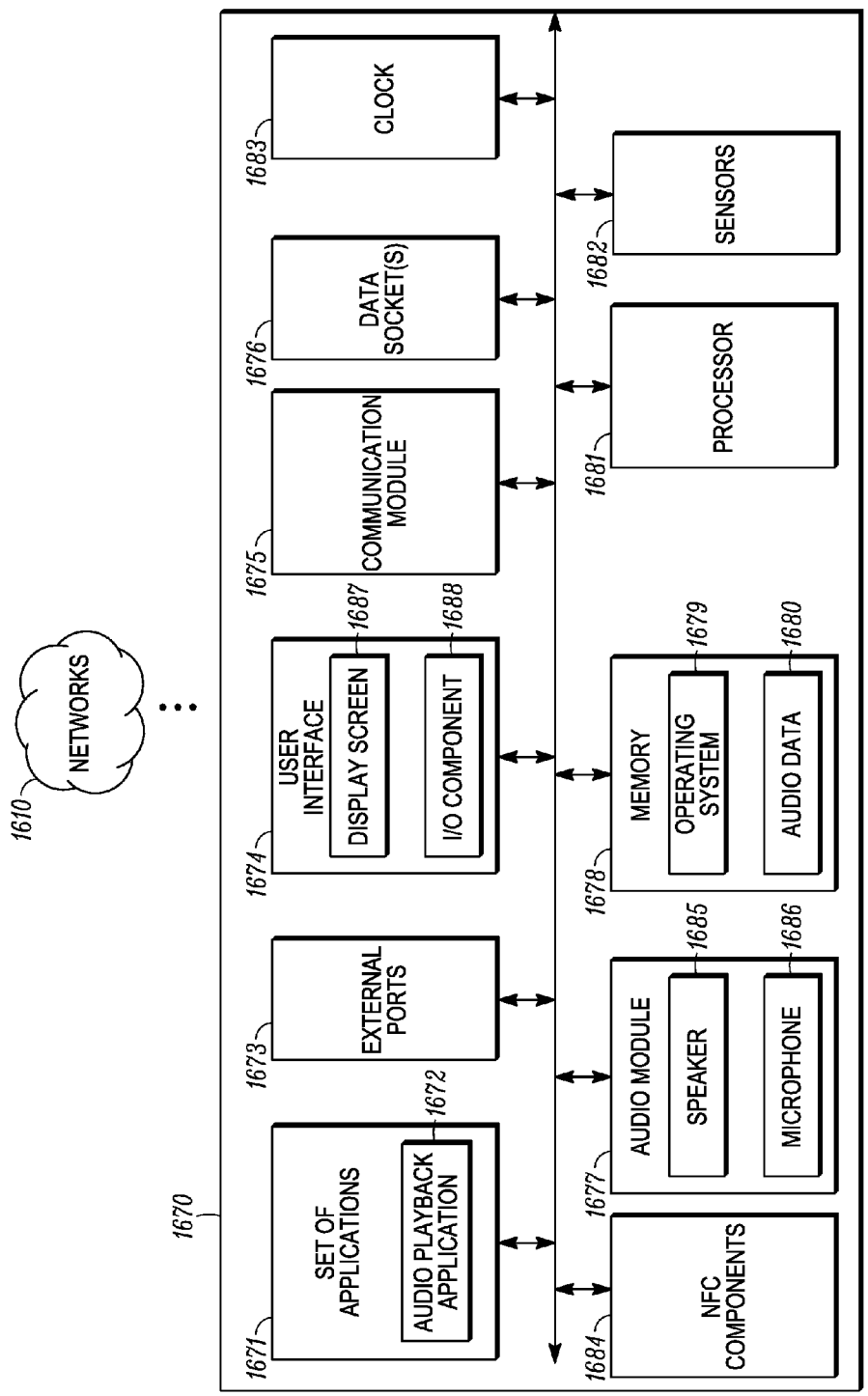
FIG. 16 is a block diagram of an electronic device in accordance with some embodiments.

FIG. 16 illustrates an example electronic device 1670 in which the functionalities as discussed herein may be implemented. The electronic device 1670 can include a processor 1681 or other similar type of controller module or microcontroller, as well as a memory 1678. The memory 1678 can store an operating system 1679 capable of facilitating the functionalities as discussed herein as well as audio data 1680 corresponding to any locally-stored audio files. The processor 1681 can interface with the memory 1678 to execute the operating system 1679 and retrieve the audio data 1680, as well as execute a set of applications 1671 such as an audio playback application 1672 (which the memory 1678 can also store). The memory 1678 can include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The processor 1681 can further interface with a clock 1683 configured to identify and manage various system times as well as schedule actions based on the system times and/or any measured acoustic latencies.

The electronic device 1670 can further include a communication module 1675 configured to interface with the one or more external ports 1673 to communicate data via one or more networks 1610. For example, the communication 1675 can leverage the external ports 1673 to establish TCP connections for connecting the electronic device 1670 to other electronic devices via a Wi-Fi Direct connection. According to some embodiments, the communication module 1675 can include one or more transceivers functioning in accordance with IEEE standards, 3GPP standards, or other standards, and configured to receive and transmit data via the one or more external ports 1673. More particularly, the communication module 1675 can include one or more WWAN transceivers configured to communicate with a wide area network including one or more cell sites or base stations to communicatively connect the electronic device 1670 to additional devices or components. For example, the transceiver can receive remotely-stored audio data via the network 1610. Further, the communication module 1670 can include one or more WLAN and/or WPAN transceivers configured to connect the electronic device 1670 to local area networks and/or personal area networks, such as a Bluetooth® network. The electronic device 1670 further includes one or more data sockets 1676 through which audio playback sessions with other devices can be established, as discussed herein.

The electronic device 1670 can further include one or more sensors 1682 such as, for example, imaging sensors, accelerometers, touch sensors, and other sensors, as well as NFC components 1684 such as an NFC chip and/or an NFC tag for pairing the electronic device 1670 with one or more other electronic devices. The electronic device 1670 can include an audio module 1677 including hardware components such as a speaker 1685 for outputting audio and a microphone 1686 for detecting or receiving audio. The electronic device 1670 may further include a user interface 1674 to present information to the user and/or receive inputs from the user. As shown in FIG. 16, the user interface 1674 includes a display screen 1687 and I/O components 1688 (e.g., capacitive or resistive touch sensitive input panels, keys, buttons, lights, LEDs, cursor control devices, haptic devices, and others). The user interface 1647 can also include the speaker 1685 and the microphone 1686. In embodiments, the display screen 1687 is a touchscreen display using singular or combinations of display technologies and can include a thin, transparent touch sensor component superimposed upon a display section that is viewable by a user. For example, such displays include capacitive displays, resistive displays, surface acoustic wave (SAW) displays, optical imaging displays, and the like.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 1681 (e.g., working in connection with the operating system 1679) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Thus, it should be clear from the preceding disclosure that the systems and methods offer improved audio playback techniques. The embodiments advantageously enable multiple electronic devices to simultaneously play audio tracks while accounting for network and acoustic latencies. The embodiments improve the user experience by improving the setup of a collective audio playback session as well as reducing the amount of playback delay between or among electronic devices.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

What is claimed is:
1. A method comprising:
joining, by a first audio playback device, an audio playback group, wherein the audio playback group includes (i) a master device that provides timing information for playback of audio content by the audio playback group, and (ii) a second audio playback device, wherein each of the first audio playback device and the second audio playback device is in a slave role in the audio playback group;

determining, by the first audio playback device, a difference between a clock of the first audio playback device and a clock of the master device;

receiving by the first audio playback device from the master device, a first time corresponding to audio data to be played by the first audio playback device as part of the audio playback group;

determining, by the first audio playback device, a second time based on (i) the first time and (ii) the difference between the clock of the first audio playback device and the clock of the master device;

playing, by the first audio playback device, the audio data at the second time according to the clock of the first audio playback device;

changing, by the first audio playback device, from the slave role to a master role in the audio playback group; and after changing from the slave role to the master role, sending, by the first audio playback device to the second audio playback device, additional audio data for playback by the second audio playback device.

2. The method of claim 1, wherein changing from the slave role to the master role in the audio playback group comprises:
sending, by the first audio playback device to the master device, a request to switch roles; and
receiving, by the first audio playback device from the master device, a role switch notification.

3. The method of claim 1, wherein changing from the slave role to the master role in the audio playback group comprises:
selecting, by the first audio playback device, the additional audio data for playback; and
in response to selecting the additional audio data, sending, by the first audio playback device to the master device, a request to switch roles.

4. The method of claim 3, wherein selecting the additional audio data for playback comprises:
detecting, via a user interface of the first audio playback device, a selection of the additional audio data for playback.

5. The method of claim 1, wherein changing from the slave role to the master role in the audio playback group comprises:
detecting a selection via a user interface of the first audio playback device; and
in response to detecting the selection, sending, by the first audio playback device to the master device, a request to switch roles.

6. The method of claim 1, wherein changing, by the first audio playback device, from the slave role to the master role in the audio playback group results in the master device having the slave role, and wherein the method further comprises, after changing from the slave role to the master role:
sending, by the first audio playback device to the master device, the additional audio data for playback by the master device.

7. The method of claim 1, wherein sending, by the first audio playback device to the second audio playback device, the additional audio data for playback by the second audio playback device comprises:
sending, by the first audio playback device to the second audio playback device, (i) the additional audio data, and (ii) timing information including the clock of the first audio playback device.

8. An audio playback device comprising:
a communication component;
a memory;
an audio output component for outputting audio; and
a controller module interfaced with the communication component, the memory, and the audio output component, and configured to:
join, via the communication component, an audio playback group, wherein the audio playback group includes (i) a master device that provides timing information for playback of audio content by the audio playback group, and (ii) a second audio playback device, wherein each of the audio playback device and the second audio playback device is in a slave role in the audio playback group,
determine a difference between a clock of the audio playback device and a clock of the master device,
receive, from the master device via the communication component, a first time corresponding to audio data to be played by the audio playback device as part of the audio playback group,
determine a second time based on (i) the first time and (ii) the difference between the clock of the audio playback device and the clock of the master device,
cause the audio output component to play the audio data at the second time according to the clock of the audio playback device,
change from the slave role to a master role in the audio playback group, and
after changing from the slave role to the master role, send, to the second audio playback device via the communication component, additional audio data for playback by the second audio playback device.

9. The audio playback device of claim 8, wherein to change from the slave role to the master role in the audio playback group, the controller module is configured to:
send, to the master device via the communication component, a request to switch roles, and
receive, from the master device via the communication component, a role switch notification.

10. The audio playback device of claim 8, wherein to change from the slave role to the master role in the audio playback group, the controller module is configured to:
select the additional audio data for playback, and
in response to selecting the additional audio data, send, to the master device via the communication component, a request to switch roles.

11. The audio playback device of claim 10, further comprising:
a user interface;
and wherein to select the additional audio data for playback, the controller module is configured to:
detect, via the user interface, a selection of the additional audio data for playback.

12. The audio playback device of claim 8, further comprising:
a user interface;
and wherein to change from the slave role to the master role in the audio playback group, the controller module is configured to:
detect a selection via the user interface, and
in response to detecting the selection, send, to the master device via the communication component, a request to switch roles.

13. The audio playback device of claim 8, wherein changing from the slave role to the master role in the audio playback group results in the master device having the slave role, and wherein the controller module is further configured to, after changing from the slave role to the master role:
  send, to the master device via the communication component, the additional audio data for playback by the master device.

14. The audio playback device of claim 8, wherein the controller module sends, to the second audio playback device via the communication component, (i) the additional audio data for playback by the second audio playback device, and (ii) timing information including the clock of the audio playback device.

15. A system for changing audio playback roles within a group audio session, comprising:
  a first audio playback device having a master role in the group audio session;
  a second audio playback device having a slave role in the group audio session; and
  a third audio playback device configured to:
    join the group audio session in the slave role,
    determine a difference between a clock of the third audio playback device and a clock of the first audio playback device,
    receive, from the first audio playback device, a first time corresponding to audio data to be played by the third audio playback device as part of the group audio session,
    determine a second time based on (i) the first time and (ii) the difference between the clock of the third audio playback device and the clock of the first audio playback device,
    play the audio data at the second time according to the clock of the third audio playback device, and
    change from the slave role to the master role in the group audio session.

16. The system of claim 15, wherein the third audio playback device is further configured to:
  after changing from the slave role to the master role, send, to the second audio playback device, additional audio data for playback by the second audio playback device.

17. The system of claim 15, wherein the second audio playback device is configured to, after the third audio playback device changes from the slave role to the master role:
  determine a difference between a clock of the second audio playback device and the clock of the third audio playback device.

18. The system of claim 17, wherein the second audio playback device is further configured to, after the third audio playback device changes from the slave role to the master role:
  receive, from the third audio playback device, a third time corresponding to additional audio data to be played by the second audio playback device,
  determine a fourth time based on (i) the third time and (ii) the difference between the clock of the second audio playback device and the clock of the third audio playback device, and
  play the additional audio data at the fourth time according to the clock of the second audio playback device.

19. The system of claim 15, wherein to change from the slave role to the master role in the group audio session, the third audio playback device is configured to:
  send, to the first audio playback device, a request to switch roles, and
  receive, from the master device, a role switch notification.

20. The system of claim 15, wherein the third audio playback device comprises a user interface, and wherein to change from the slave role to the master role in the group audio session, the third audio playback device is configured to:
  detect a selection via the user interface, and
  in response to detecting the selection, send, to the first audio playback device, a request to switch roles.

* * * * *

UNITED STATES PATENT AND TRADEMARK OFFICE
CERTIFICATE OF CORRECTION

PATENT NO. : 9,967,848 B2  
APPLICATION NO. : 15/794868  
DATED : May 8, 2018  
INVENTOR(S) : Michael J. Daley et al.

Page 1 of 1

It is certified that error appears in the above-identified patent and that said Letters Patent is hereby corrected as shown below:

On the Title Page

Item (*) "Notice", Line 3, "0 days. days." should be -- 0 days. --.

Signed and Sealed this
Second Day of October, 2018

Andrei Iancu
*Director of the United States Patent and Trademark Office*